US012806565B2

(12) United States Patent
Akyildiz

(10) Patent No.: US 12,806,565 B2
(45) Date of Patent: Nov. 24, 2026

(54) CONTROL SYSTEMS AND METHODS FOR EXHAUST POLLUTION MITIGATION

(71) Applicant: ECC TEC MSJ INCORPORATED, Boca Raton, FL (US)

(72) Inventor: Saban Akyildiz, Boca Raton, FL (US)

(73) Assignee: ECC TEC MSJ Incorporated, Boca Raton, FL (US)

( * ) Notice: Subject to any disclaimer, the term of this patent is extended or adjusted under 35 U.S.C. 154(b) by 5 days.

(21) Appl. No.: 19/684,665

(22) Filed: May 21, 2026

(65) Prior Publication Data

US 2026/0295519 A1 Oct. 1, 2026

Related U.S. Application Data

(62) Division of application No. 18/962,618, filed on Nov. 27, 2024, now Pat. No. 12,636,610.

(51) Int. Cl.
*B01D 53/34* (2006.01)
*B01D 53/86* (2006.01)

(52) U.S. Cl.
CPC ....... *B01D 53/346* (2013.01); *B01D 53/8631* (2013.01); *B01D 2251/2062* (2013.01); (Continued)

(58) Field of Classification Search
None
See application file for complete search history.

(56) References Cited

U.S. PATENT DOCUMENTS 3,956,614 A 5/1976 Hervert
4,276,066 A 6/1981 Bly
4,450,681 A 5/1984 Sato
(Continued)

FOREIGN PATENT DOCUMENTS

CN 2597684 1/2004
CN 105771645 7/2016
(Continued)

OTHER PUBLICATIONS

Mohit A. Bagul et al., "Emission Reduction using Magnetic Pollution Filter," International Journal of Innovative Research in Science, Engineering and Technology, vol. 5, Issue 7, Jul. 7, 2016.
(Continued)

*Primary Examiner* — Matthew D Krcha
(74) *Attorney, Agent, or Firm* — Dentons US LLP; Derek Auito

(57) ABSTRACT

This disclosure includes a control system for operating a pollution removal system. The system includes a power relay coupled to a power supply and a controller communicatively coupled to the power relay. The controller receives sensor data corresponding to properties of at least one of (i) a dosing solution tank of the pollution removal system, (ii) a heater assembly configured to vaporize dosing solution provided by the dosing solution tank, and (iii) a flue system configured to receive a flue gas and the vaporized dosing solution and remove pollutants from the flue gas. Using the sensor data, a control operation is determined for improving removal of pollutants from the flue gas. A control signal corresponding to the control operation is transmitted for use by the power relay. The power relay provides a corresponding power signal to adjust operation of at least one component of the pollution removal system.

19 Claims, 18 Drawing Sheets

(52) U.S. Cl.
CPC ................ *B01D 2251/2067* (2013.01); *B01D 2257/404* (2013.01); *B01D 2258/0283* (2013.01)

(56) References Cited

U.S. PATENT DOCUMENTS

| | | | | |
|---|---|---|---|---|
| 4,945,721 | A | 8/1990 | Cornwell et al. | |
| 5,063,029 | A | 11/1991 | Mizuno et al. | |
| 5,234,668 | A | 8/1993 | Harada et al. | |
| 5,264,186 | A | 11/1993 | Harada et al. | |
| 5,423,904 | A | 6/1995 | Dasgupta | |
| 5,465,573 | A | 11/1995 | Abe et al. | |
| 5,569,455 | A | 10/1996 | Fukui et al. | |
| 5,582,805 | A | 12/1996 | Yoshizaki et al. | |
| 6,585,940 | B2 | 7/2003 | Abe et al. | |
| 8,309,032 | B2 | 11/2012 | Plati et al. | |
| 9,383,119 | B2 | 7/2016 | Kida et al. | |
| 11,149,607 | B2 | 10/2021 | Akyildiz | |
| 2001/0043890 | A1 | 11/2001 | Son | |
| 2002/0053283 | A1 | 5/2002 | Akyildiz | |
| 2004/0118111 | A1 | 6/2004 | Covit | |
| 2006/0204408 | A1 | 9/2006 | Son | |
| 2008/0196763 | A1 | 8/2008 | Gretta et al. | |
| 2008/0306631 | A1 | 12/2008 | Huang | |
| 2009/0074630 | A1 | 3/2009 | Gonze | |
| 2011/0162348 | A1 | 7/2011 | Kim et al. | |
| 2013/0061576 | A1 | 3/2013 | Gonze et al. | |
| 2014/0099248 | A1* | 4/2014 | Broderick | B01D 53/565 423/239.1 |
| 2017/0218823 | A1 | 8/2017 | Crawford | |
| 2017/0226909 | A1 | 8/2017 | Hirth et al. | |
| 2017/0284258 | A1* | 10/2017 | Saiki | F01N 3/2026 |
| 2020/0188851 | A1 | 6/2020 | Tanaka | |
| 2021/0372310 | A1 | 12/2021 | Bare et al. | |
| 2023/0323800 | A1 | 10/2023 | Akyildiz | |
| 2023/0338897 | A1 | 10/2023 | Bednar et al. | |

FOREIGN PATENT DOCUMENTS

| | | |
|---|---|---|
| CN | 206762544 | 12/2017 |
| CN | 111577430 | 8/2020 |
| CN | 113663513 | 11/2021 |
| DE | 102009014371 | 9/2010 |
| EP | 153157 | 8/1985 |
| EP | 967174 | 12/1999 |
| EP | 1967712 | 9/2008 |
| GB | 2512845 | 10/2014 |
| JP | 2009097359 | 5/2009 |
| WO | WO9421900 | 9/1994 |
| WO | WO52309 | 9/2000 |
| WO | WO0157370 | 8/2001 |
| WO | WO2017198292 | 11/2017 |
| WO | WO2021080651 | 4/2021 |

OTHER PUBLICATIONS

Ali S. Faris, et al., "Effects of Magnetic Field on Fuel Consumption and Exhaust Emissions in Two-Stroke Engine," Energy Procedia, vol. 18, pp. 327-338, 2012.

Karthik Dhayakar et al., "Effect of Twin Sparkplug in Two Stroke IC Engine," International Journal of Science and Research (IJSR), vol. 4, Issue 2, pp. 2147-2153, Feb. 2015.

Adel Mahmmod Salih et al., "The Effect of magnetic field on the boiler performance fueled with disel," International Journal of Scientific & Engineering Research (IJSER), vol. 7, Issue 2, pp. 406-410, Feb. 2016.

H.R. Jackson, et al., "Catalytic Nox Reduction Studies," SAE Technical Paper, 730568, 1973, doi; 10.4271/730568.

International Search Report and Written Opinion Application No. PCT/US2019/063387 dated Feb. 7, 2020.

* cited by examiner

CONTROL SYSTEMS AND METHODS FOR EXHAUST POLLUTION MITIGATION

This application is a divisional of U.S. patent application Ser. No. 18/962,618, filed on Nov. 27, 2024, the entire disclosure of which is incorporated herein by reference.

BACKGROUND

This disclosure includes exhaust control systems and methods designed for the cleaning and mitigation of pollution generated by power plants and industrial facilities, including coal-fired power plants. More specifically, embodiments address the need for an efficient and environmentally conscious exhaust system capable of reducing harmful emissions and pollutants released during the industrial processes.

With the increasing global focus on environmental sustainability and the adverse effects of industrial emissions on air quality, there is a growing demand for innovative technologies that can effectively mitigate pollution from power plants and industrial facilities. Traditional exhaust systems often fall short in achieving the desired level of pollutant removal, such as carbon dioxide and other emissions, leading to environmental concerns and regulatory challenges. Existing exhaust systems typically rely on conventional methods like electrostatic precipitators or scrubbers, which might have limitations in capturing specific pollutants or might involve high operational costs. Furthermore, the ongoing evolution of industrial processes has led to a demand for exhaust systems adaptable to different pollutants and operational conditions. Additionally, integrating pollution mitigation technologies at industrial facilities, whether by constructing new facilities or retrofitting existing ones, has posed a challenge due to external factors that negatively affected their economic viability.

SUMMARY

The embodiments of this disclosure overcome the limitations of existing exhaust systems by providing a novel and versatile solution for pollution mitigation in power plants and industrial facilities. The proposed exhaust system enhances the efficiency of pollutant capture, reduces operational costs, and promotes environmental sustainability.

Embodiments include a combination of heaters configured to generate a vapor of dosing solution that pollutants pass through before entering one or more filters, at least one of which is surrounded by one or more magnets. This advanced filtration technology includes advanced filtration materials and mechanisms designed to effectively capture a wide range of pollutants, including particulate matter, sulfur dioxide, nitrogen oxides, and other harmful emissions. This ensures optimal performance and compliance with stringent environmental regulations. Embodiments can include an intelligent and adaptive control system integrated into the exhaust system, allowing real-time monitoring of pollutant levels and adjusting filtration parameters accordingly. This adaptability ensures optimal performance under varying operational conditions. The exhaust system incorporates energy-efficient components and processes to minimize power consumption and operational costs, contributing to the overall sustainability of industrial operations.

In conclusion, the present disclosure represents a significant advancement in the field of exhaust systems for pollution mitigation in power plants and industrial facilities. The combination of advanced filtration technology, selective pollutant removal, adaptive control, and energy efficiency distinguishes this disclosure from existing solutions, making it a valuable contribution to the ongoing efforts towards a cleaner and more sustainable industrial environment.

In one example, a flue or smokestack may include one or more external heater assemblies configured to vaporize a dosing solution, each of the external heater assemblies. One or more of the heating assemblies can a housing, an interface configured to connect the housing to the flue, one or more heating elements, and one or more dosing solution injectors configured to generate a mist adjacent to the one or more heating elements, wherein the heating elements are configured to generate heat to vaporize the mist into a vapor. The heating assemblies may further include more or more dividers to distribute the vapor within the flue. The flue may further include one or more filters arranged in the flue downstream from the vaporized dosing solution, and one or more magnets arranged adjacent to a subset of the one or more filters. The flue may further include separate internal heaters arranged inside the flue adjacent to the one or more filters. A controller may be configured to control a first voltage applied to the one or more external heaters, a second voltage to the one or more internal heaters, and a pressure applied to the dosing solution to the one or more dosing solution injectors.

The flue system may further include one or more blowers to increase a rate of flow of emissions through the flue. The blowers may be located at various portions of the emissions system to ensure proper follow rate and effective pollution reduction. The controller may control the amount of power generated to the one or more blowers depending on sensor data.

Sensor data can include data from one or more gas sensors coupled to the controller, wherein the controller is configured to vary inputs, such as heat and pressure, to a single flue in response to data received from the one or more gas sensors.

The external heaters may include a pressure sensor configured to detect a dosing solution fluid pressure at the one or more dosing solution injectors.

The flue may also include various temperature sensors configured to detect the temperature inside the housing at various locations.

The heating elements can be arranged in a spiral or coil surrounding a direction in which the mist flows to convert the mist into a vapor.

The external heaters further comprise an overflow valve configured to return dosing solution to a pump when there is an overload in the pressure, the pump coupled to a dosing supply tank.

The flue can also include a communications interface, comprising one or more connections to various sensors and components, and configured to communicate data to and from a controller.

The flue external heaters may include one or more solenoids to control pressure of the dosing solution in the injector.

The internal heaters of the flue may include a ribbon-shaped filament made of a current conducting material that has resistance to generate heat. The ribbon-shaped filament may be bent in a serpentine configuration and have a porous wall. The ribbon-shaped filament may include major surface oriented perpendicular to a plane of the serpentine structure to not obstruct emission flow and to heat it up to increase pollutant reduction. The internal heaters may be supported by one or more brackets.

Some examples include two heaters supported on opposite sides of the bracket.

Another example of a representative system includes a flue, a selective catalytic reduction (SCR) agent injector coupled to the flue, and at least one heater. The flue may also include a nitrous oxide (NOx) filter, a SCR filter, a magnet coupled a temperature sensor; and at least one gas composition sensor. The magnetic field can disrupt, slow down, or both disrupt and slow down flue gas flowing through the flue. The at least one magnet may be positioned inside or outside of the flue. It may be advantageous to insulate the magnet from heat. The magnet may be an electro or permanent magnet, and may include a plurality of magnets or magnet units positioned along a longitudinal axis of the flue.

The emissions system may also include a pump coupled to a dosing supply tank, wherein the pump is configured to pump dosing solution to one or more injectors adjacent to the at least one heater.

Examples may include a processor configured to detect a temperature inside the flue, and to automatically adjust the temperature inside the flue based on the detected temperature detected inside the flue by controlling voltage to one or more heaters. The adjustment may include varying a voltage applied to heating elements. The system may also include a pressure sensor coupled to the processor and configured to detect a pressure inside of a dosing tube between the pump and the one or more injectors. The processor may also adjust pressure output by the pump in response to detecting the pressure inside the dosing tube. The flue system can also include a plurality of heaters to heat the dosing solution.

The plurality of heaters may be arranged at different offsets relative to the flue to distribute dosing solution vapor more evenly.

The system can include an SCR agent injector coupled to one of the plurality of heaters and configured to inject the agent adjacent to the heater.

Another example includes a selective catalytic reduction (SCR) system for mixing a dosing solution vapor with an exhaust gas. The system can include a heater to heat the dosing solution, wherein the dosing solution comprises a nitrogen portion and an aqueous portion. The system may include a flue comprising a first inlet to direct the heated dosing solution to a SCR reaction chamber. The system may also include a second inlet for introducing the exhaust gas into the SCR reaction chamber, wherein the dosing solution undergoes an NOx reduction in the SCR reaction chamber to produce oxidized particulates. The system can include one or more magnets arranged adjacent to the SCR reaction chamber, at least one SO2 honeycomb, at least one NOx particulate, and at least one particulate filter arranged within the SCR reaction chamber. The oxidized particulates are removed from the SCR reaction chamber by the at least one magnet and the at least one SO2 honeycomb, the at least one NOx particulate, and the at least one particulate filter. A controller may be coupled to the heater to control an amount of heat applied to the dosing solution to generate the dosing solution vapor.

The dosing solution may include various percentages of components, such urea or ammonia and 3.0-4.0% w/v of a salt. The dosing solution may also include 30% w/v of the nitrogen portion and 70% w/v of the aqueous portion.

The system may include a dosing solution supply tank to direct the dosing solution to the SCR reaction chamber. The supply tank may be coupled to dosing tubing. The dosing tube may be equipped with at least one pressure sensor and is connected to at least one pump to detect a pressure in the dosing tubing.

The pressure in the dosing tubing can vary, may be is at least 60 psi.

The pump can include an automatic shutoff system when the pressure in the dosing tubing is below a predetermined level. The dosing solution supply tank may include a mixer to mix the dosing solution to keep its composition consistent. A controller may be coupled to the heater to control the amount of heat applied to the dosing solution to generate the dosing solution vapor.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments of the disclosure can include one or more components including a one or more controllers, one or more heaters, one or more dosing agent injectors (also known as selective catalytic reduction (SCR) agent injector), dosing agent, one or more flues (also known as smokestacks, ducts, pipes, flue-gas stacks, or openings for conveying exhaust gases to the outdoors), one or more magnets, one or more filters, and one or more pump, pressure sensors, gas composition sensors, temperature sensors, couplings, and pipes. Embodiments include individual components and combinations of them. The magnets can be electric, permanent, or a combination of the two. Embodiments may include a magnet surrounding or nearby or adjacent to a subset of one or more filters. The magnets may be inside or outside of the flue, but they are preferably outside of the flue. In some embodiments, a plurality of magnet units (e.g., each unit contains at least one magnet) may be positioned along a longitudinal axis of the flue with each magnet providing a respective magnetic field within the flue.

A controller may receive sensor data from one or more sensors coupled to one or more of the components, such as the pressure sensors, the temperature sensors, the heaters, the gas composition sensors, the dosing agent injectors, pump, a communications interface, and other components. The controller includes software for reading values from each of the sensors and controlling the inputs to the system, including heat, pressure, mixing, and dosing solution, to maximize pollutant reduction. The controller may be programmed to send different voltages to components such as blowers, heaters, magnets, and pumps to optimize the performance of the system.

I. Industrial Flue System

Figure 1:
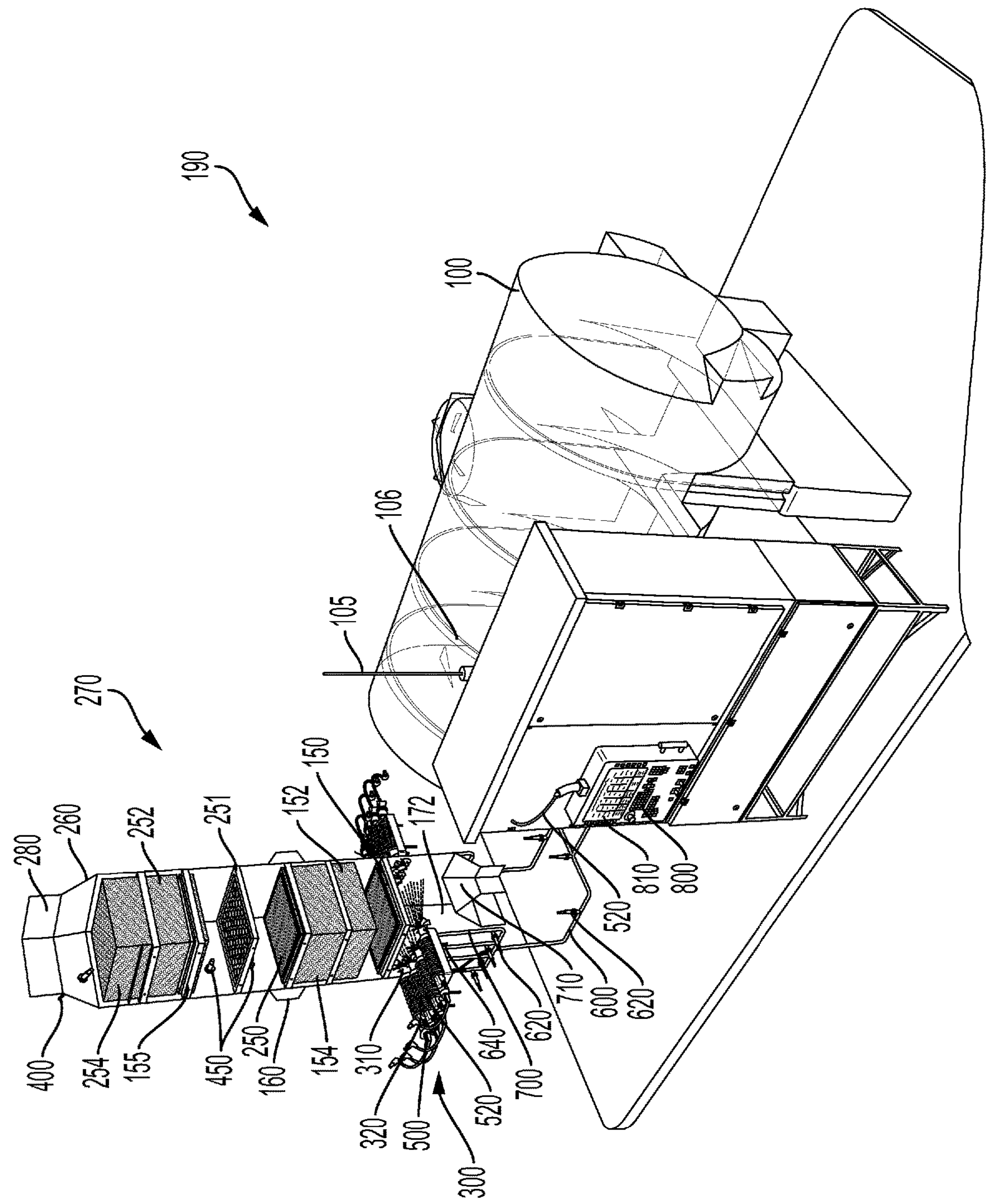
FIG. 1 illustrates a vertical flue including heaters, filters, and other components in accordance with various embodiments in accordance with some embodiments of the present disclosure.
Figure 2:
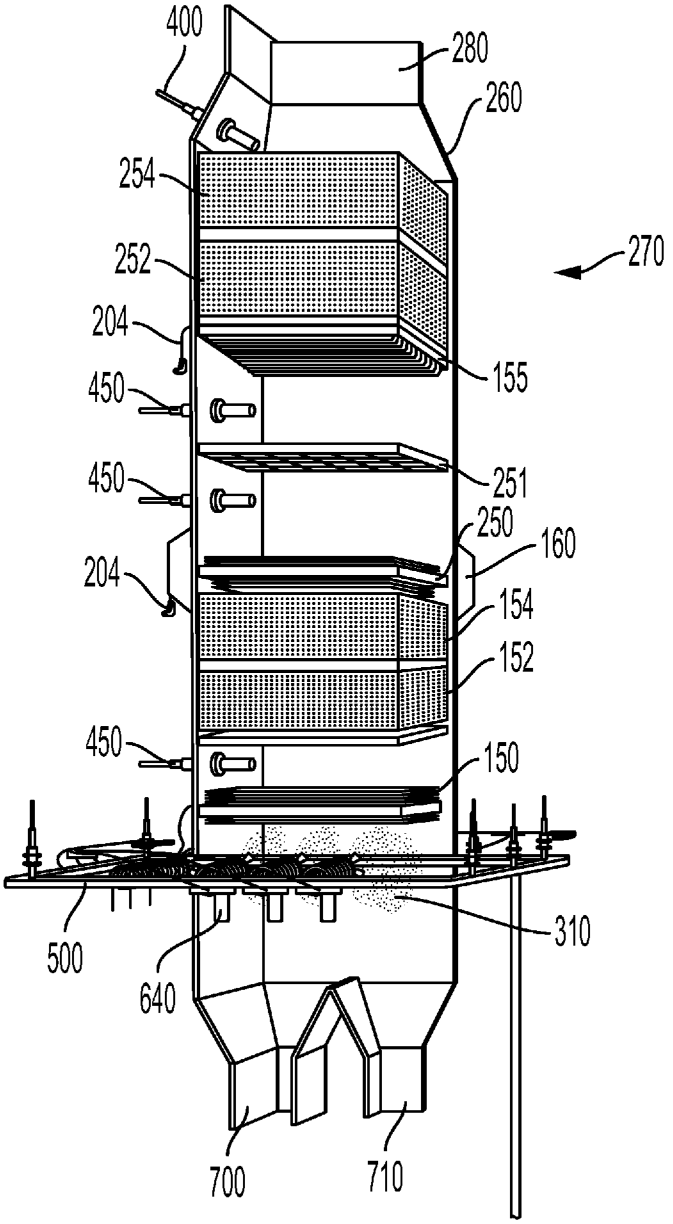
FIG. 2 illustrates a different perspective view of the vertical flue of FIG. 1.
Figure 3:
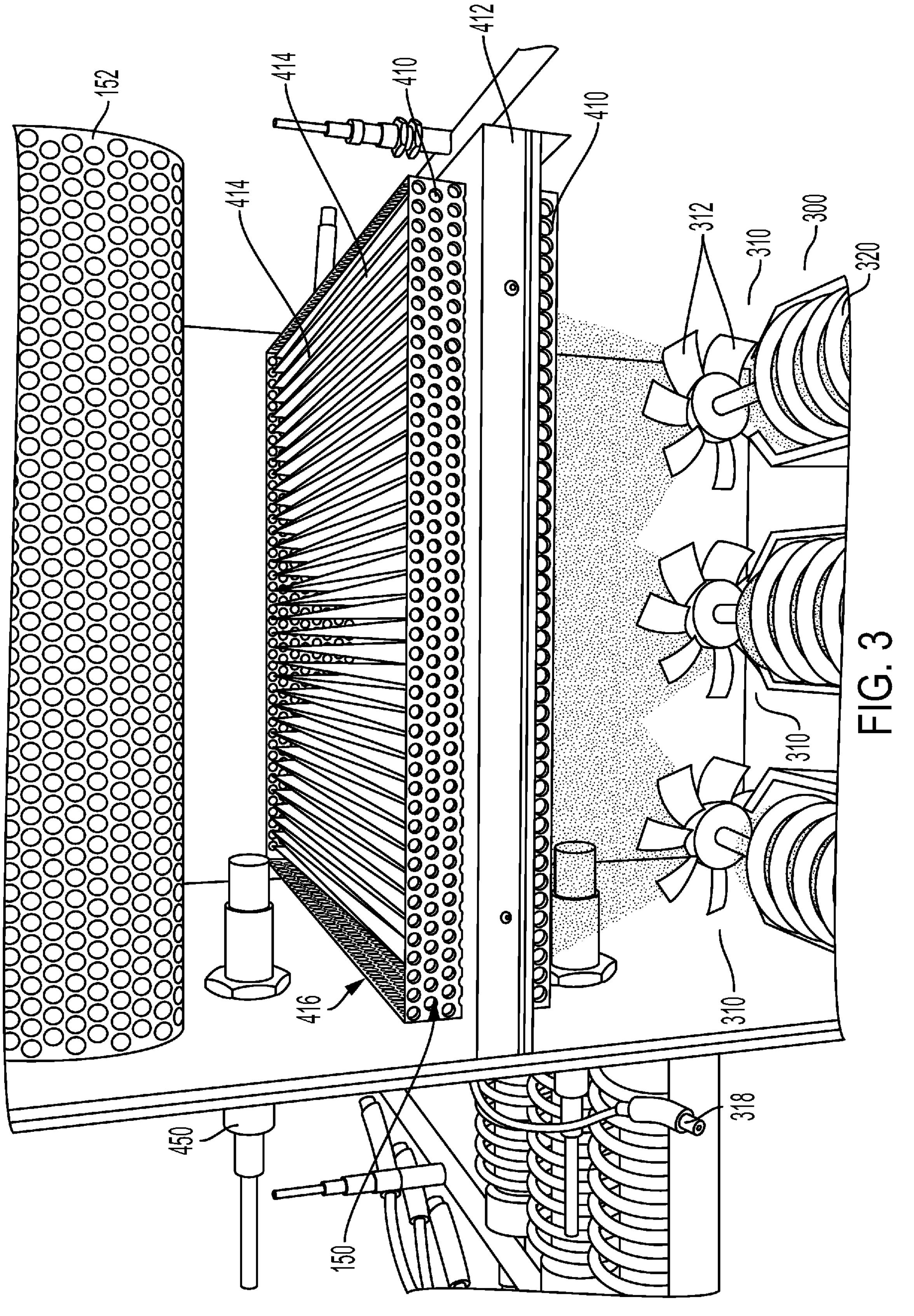
FIG. 3 illustrates an example heater inside of a filter of FIG. 1.

In FIGS. 1-3 there is depicted in perspective view a cutaway of an example flue system 190 for a power plant embodying principles disclosed herein. The depicted flue system 190 includes a flue 270 for channeling post combustion gases to a flue emission outlet 280. In this description, the flue emission outlet 280 is located downstream of an inlet 700 through which the post-combustion gases are received into the flue 270. In the example flue system 190, there is a single flue 270, but multiple flues can be configured. As used herein "flue" refers to a SCR reaction chamber which is where conversion of nitrous oxide (NOx) in exhaust gas into nitrogen and water takes place in the presence of catalyst material. To perform the conversion, the SCR reaction chamber contains cassettes of the catalyst material.

In this embodiment, the flue 270 is vertically oriented with the inlet 700 located at a bottom of the flue 270 and the flue emission outlet 280 located at a top of the flue 270. Also located at the bottom of the flue 270 is a trap 710 used to collect falling particulates. The trap 710 has a door (not illustrated) that can be opened to release collected particulates for disposal or further processing. In some configurations, a collection device (not illustrated) such as a bucket, a receptacle, or a disposal system (e.g., a chamber, waste disposal tubing, etc.) may be positioned below the trap 710. Further, in some embodiments, the flue 270 may include one or more blowers to increase the rate of flow of the emissions through the flue 270.

Figure 4:
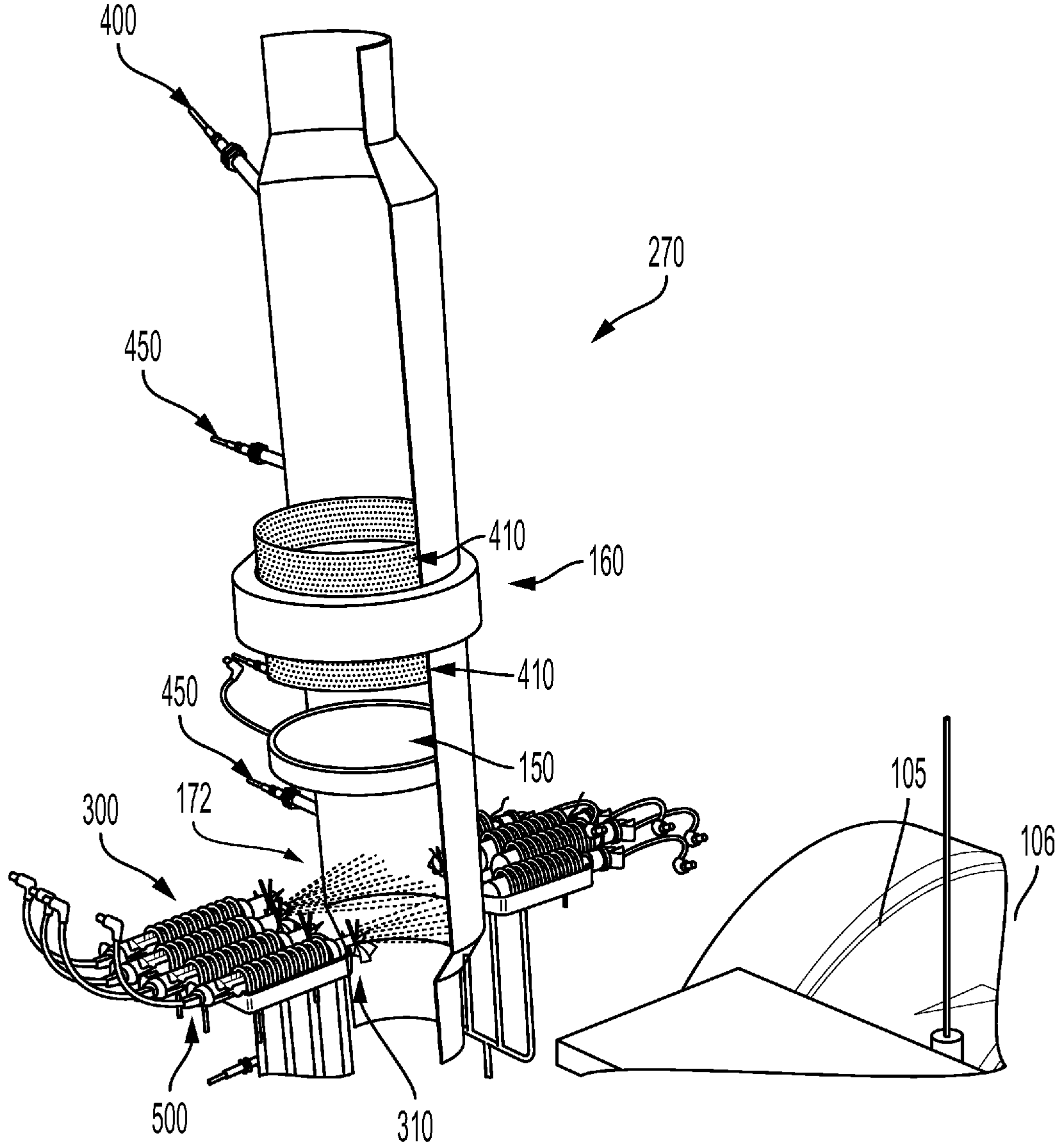
FIG. 4 illustrates a circular flue in accordance with some embodiments in accordance with some embodiments of the present disclosure.

It can be appreciated that given that the illustrated flue 270 is rectangular in cross section, the selective catalytic reduction (SCR) catalysts, heaters, and filters described below preferably are rectangular in shape also along an axis of the flue 270. In other embodiments, e.g., as depicted in FIG. 4, the flue can be circular or oval, and thus the SCR filters, heaters, and filters preferably are circular or oval along the axis of the flue, mutatis mutandis, respectively.

The flue system 190 preferably is provided with various gas cleaning apparatus along the flow path of the post combustion gases as they travel through the flue 270. To that end, in this exemplary embodiment, downstream of the inlet 700 is an arrangement of selective catalytic reduction (SCR) reduction or dosing solution injectors 500 which inject the reduction solution/dosing solution into the flue 270 to mix it with and react it with the post combustion gases. The preferred dosing solution injectors 500 are described in greater detail elsewhere. However, it is noted that the dosing solution injectors 500 are illustrated in cutaway view of ease of explanation.

As described above, SCR systems remove NOx from flue gases emitted by power plant boilers, gas turbines, and other combustion sources. An SCR system selectively reduces NOx emissions by injecting a reduction agent such as ammonia (NH3) into the exhaust gases upstream of a catalyst. The NOx reacts with NH3 and oxygen (O2) to form nitrogen (N2) and water (H2O).

However, it is noted here that the dosing/reduction agent or solution is preferably output from the dosing solution injectors 500 (also known as selective catalytic reduction (SCR) agent injector) in the form of mist to better mix and interact with the flue gases. An external heater assembly 300, such as illustrated in at least FIGS. 1-4, may be used to convert the mist into a gas or vapor state. As illustrated by FIG. 1, the external heater assembly 300 includes dividers 310, a heating element 320 (e.g., a set of coils), and an injector 500. In some embodiments the external heater assembly 300 receives power from power assembly 318. That vapor 172 may be directed at dividers 310 which serve to further disperse the vapor 172. As illustrated, the dividers 310 preferably comprise radially extending blades 312 and, to an extent, resemble fan blades. Preferably, the dividers 310 are static and do not rotate, however, the dividers 310 or the extending blades may be configured to rotate. As illustrated, a respective dividers 310 is associated a corresponding injector 500. In some embodiments, the external heater assembly 300 may also include an overflow valve configured to return dosing solution to a pump when there is an overload in the pressure. Other configurations of the external heater assembly 300 include one or more solenoids to control pressure of the dosing solution in the injector. The pump may be coupled to a dosing supply tank as described below. While FIG. 1 illustrates three pairs including a divider 310 and an injector 500, any combination of dividers 310 and injectors can be used. Additional description of the external heater assembly 300 is provided below.

Downstream of the dosing solution injectors 500 is a heater unit 150. In the illustrated embodiment, two electric heaters 410 are provided in the heater unit 150, with the two heaters 410 supported on opposite sides of a bracket 412. As best seen in FIG. 3, each heater 410 preferably comprises a ribbon-shaped filament 414 or a heating element that is formed or bent into a serpentine or galloping configuration or structure with relatively sharp bights and contained within a porous wall 416. The wall 416 preferably has a honeycomb or mesh structure to allow flow of gases therethrough.

The ribbon-shaped filament 414 may be formed of a current conducting material such as a ferrous metal, or other material which conducts electricity. The ribbon-shaped filament 414, which has a relatively large flat or major surface area and is oriented with the flat or major surface parallel to the flow of the flue gases, i.e., to the major plane of the serpentine structure. The ribbon-shaped filament 414 or heater may have a major surface oriented perpendicular to a plane of the serpentine structure. The number of bights will vary depending on the amount of heat a heater is designed to impart and the impact on the flow of the flue gases. The heater unit 150 may be comprised of one or more heating elements and may also include a particulate filter to filter out or burn up any remaining large particulates remaining in the exhaust. The large particulates may get trapped within the filter, burned up, or may drop to be collected in a collection unit below the flue. However, in general, with this orientation and with the serpentine/galloping configuration, the heaters 410 allow for the flow of flue gases with the entrained and interacting dosing/reduction agent to pass through the heater while imparting maximum heat to the flue gases.

As illustrated in FIG. 2, the two heater units 150 (e.g., internal heaters within the flue) receive power from heater power assembly 204. In some embodiments, separate heater power assemblies may be used for each of the heater units 150. In other embodiments, a single heater power assembly may be coupled to the heater units 150 in series or in parallel. The two heater units 150 include an electric terminal through which current can be applied to the ribbon-shaped filament. At least one of the heating elements may be arranged in a spiral surrounding the direction in which the mist flows.

Ribbon filaments are efficient and provide the most heat per square inch or area. Ribbon elements can be low profile, flexible, and have large heat transfer areas. Ribbon filaments provide high power density, excellent hot strength and low watt density. They can be suspended or supported on insulated fixtures, particularly at a bight.

Ribbon filaments can be manufactured from nichrome, iron-chrome, iron-chrome-aluminum alloy, nickel-chrome, nickel-iron, nickel, stainless steel, molybdenum, tungsten, or MoSi2 conductor wire. Insulation materials used on or with the filaments or heating elements include mica, asbestos, ceramics, synthetic liquids, polymers and/or fiberglass.

As can be appreciated, the heaters 410 serve to heat the flue gases and the dosing/reduction agent so that when the gas and the dosing/reduction agent reach an SCR filter described below, it will reduce the likelihood of cracking and other damage to the catalyst caused by the impact of flue gases and dosing/agent that are too cold and that could cool the SCR filter too quickly.

Further, it can be appreciated that a given heater 410 can have more than one ribbon-shaped filament or one-more more rod-shaped filaments. Other exemplary heater configurations include different numbers of heaters that can be arranged at different offsets relative to the flue to distribute dosing solution vapor more evenly.

Downstream of the particulate filter 251 is an arrangement comprised of a heater unit 155, an oxidation and particulate filter 252 (or diesel particulate filter (DPF)), and a NOx/$SO_2$ and SCR filter 254 (referred to herein as SCR filter 154), in that order along the flow of the flue gases. The heater unit 155, the particulate filter 252 and the SCR filter 254 preferably are structurally the same as the heater unit 150, the oxidation and particulate filter 152 (or diesel particulate filter (DPF)), and the SCR filter 154, respectively. However, they could be differently structured. For example, the active surface of the SCR filter 254 could be coated with different materials than those coating the active surface of the SCR filter 154.

In this arrangement, the heater unit 155 is located upstream of the oxidation and particulate filter 252 rather than downstream of the SCR filter 254 to impart more heat to the flue gases before they reach the SCR filter 254.

As also illustrated, positioned at an outside of the flue 270 is at least one magnet or magnet unit 160. In this embodiment, the magnet unit 160 is positioned and configured to surround the heater unit 155. This magnet unit 160 provides a magnetic field that extends into the flue and the flue gases that serves to further disrupt and slow the flow of the gases. The magnet unit 160 preferably is insulated, e.g., by a double wall structure, from the flue 270 and the heat of the flue gases.

The magnet unit 160 can be comprised of one or more electromagnets or one or more permanent magnets. The magnet unit 160 need not surround the flue 270 if a sufficient magnetic field can be generated/provided by a magnetic field generating unit that does not surround the flue 270.

While only one magnet unit is illustrated in this embodiment, it can be appreciated that more than one magnet unit can be used along the axis or longitude of the flue 270 depending on the amount of disruption and slowing down of the flue gases is desired for a given flue design. Additionally, the magnet units need not be identically configured or of the same types. For example, there can be advantages to using an electromagnet which can be turned on and off, as well as advantages to permanent magnets that require less maintenance concerns. Suitable permanent magnets include neodymium magnets.

In one embodiment, a magnet unit can comprise a plurality of permanent magnets. The plurality of magnets may have an interior profile to conform to the outer profile of the flue. For example, for a flue with a circular or oval cross section, the interior profile of the magnets may be curved. The plurality of magnets may be provided in sets. The plurality of magnets may be disposed in an array having alternating polarities with the opposing polarities facing each other. Alternatively, the magnets may have the same polarity and the polarity may not vary along the longitudinal direction. Having magnets facing each other with opposite polarities results in a stronger magnetic field.

In one embodiment, a central core magnetic rod may be provided as a part of the set of magnets. The central core magnetic rod may allow varying arrangements of polarities of the magnets. For example, the outer magnets that face each other may have the same or different polarities, which may vary along the longitudinal direction. In addition, the central core magnetic rod may be one piece extending from one longitudinal position to another longitudinal position, with one polarity at each end. Alternatively, the central core magnetic rod may be made of segments that may be separated from each other in the longitudinal direction and have polarities that may vary in the longitudinal direction.

While only one magnet unit is illustrated in this embodiment, it can be appreciated that more than one magnet unit can be used along the flue 270 depending on the amount of disruption and slowing down of the flue gases is desired for a given flue design. Additionally, the magnet units need not be identically configured or of the same types. For example, there can be advantages to using an electromagnet which can be turned on and off, as well as advantages to permanent magnets that require less maintenance concerns.

As can be appreciated, the conditions within the flue 270 can be monitored in various ways. For example, gas compositions can be monitored as can the temperature of the flue gases. In this way, the operation of the flue gases cleaning system can be monitored.

In the illustrated embodiment, between the heater unit 150 and the oxidation and particulate filter 152 there is provided a temperature sensor 450 for detecting the temperature of the flue gases exiting the heater unit 150. A signal indicative of the detected temperature is sent to the control panel 800, which in turn controls the operation of the heater unit 150 by either turning the heater unit on or off or by controlling the amount of current fed to the heater unit 150.

Between heater unit 250 and the particulate filter 251 is another temperature sensor 450. The temperature sensor 450 senses the temperature of the flue gases exiting the heater unit 250. A signal indicative of the sensed temperature is sent to the control panel 800 via the communication wires 520, which in turn controls the operation of the heater unit 250 by either turning the heater unit on or off or by controlling the amount of current fed to the heater unit 250.

Between the particulate filter 251 and the heater unit 155 is another temperature sensor 450. This temperature sensor 450 can also be referred to as the emergency temperature sensor 450. A signal indicative of the sensed temperature is sent to the control panel 800. If the temperature within the flue 270 exceed a desired amount or is rising too quickly, the controller can shut down the entire system or all the heater units to thereby prevent damage to the system.

Downstream of the SCR filter 154, at the flue emission outlet 280 is a gas composition sensor 400. The gas composition sensor 400 can measure the amounts of NOx, $SO_2$, and/or other gases, or be dedicated to only measure the amount one or some of those gases. A signal indicating the amount(s) of the one or more of these gases is fed back to the control panel 800 which can then determine how well the system is operating and if any corrective actions are needed. A corrective action can include replacing one or more filters, one or more heating units, and/or one or more SCR filters. A corrective action can include adjusting the dosing/reduction agent injectors.

In that connection, it is noted that each of the heating units and filters described herein may be configured and mounted within the flue to be easily replaced. To that end, while not shown for ease of understanding, these units, can be exposed by opening a respective door or cover provided in the flue 270 and the respective heating units and filters can be slid out of the flue and a replacement slid into place.

Figure 5:
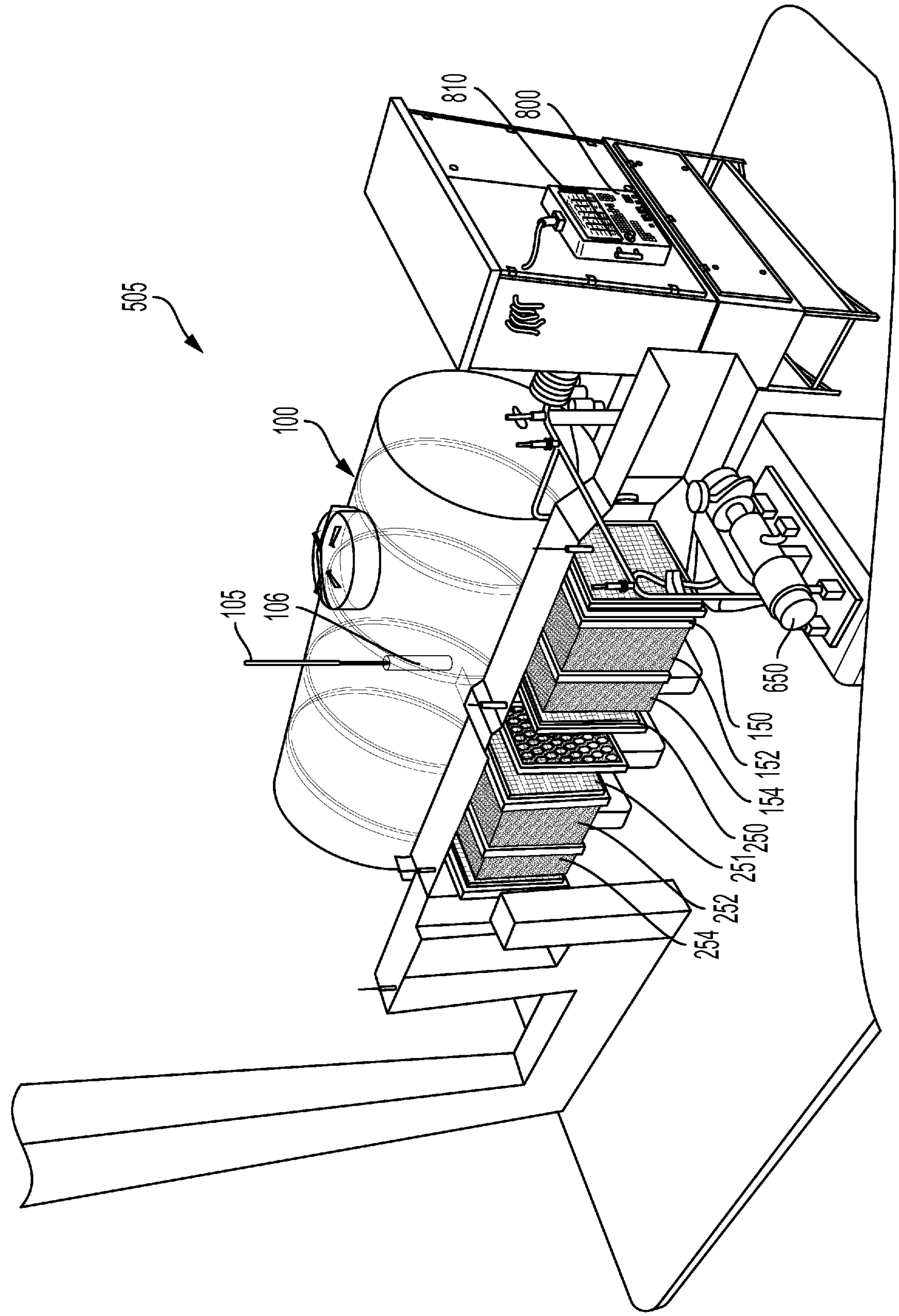
FIG. 5 illustrates a flue in a horizontal configuration in accordance with some embodiments in accordance with some embodiments of the present disclosure.

In FIG. 5, there is illustrated another flue system 505 that is like the flue system 190 of FIG. 2, but which has a horizontal orientation, that is the longitude, and hence the flue gases flow is along a horizontal axis. In some configurations, the arrangement of the heater unit(s), particulate filter(s), oxidation and particulate filter(s)/diesel particulate filter (DPF), SCR filter(s), magnet unit(s), and dosing/reduction agent injectors is sufficiently similar and is omitted here for brevity. However, the numbers and positioning of these items will vary depending on the size and design of the power plant and the reference to FIG. 2 is not limiting to any particular configurations or components of the horizontal orientation. For example, in this flue system with the horizontal orientation, the particulate trap is located downstream of the flue gas cleaning system rather than upstream of the flue gas cleaning system. That is because, with the horizontal orientation, gravity will not cause the heavy particles in the flue gas to fall out at the flue system inlet. Rather, the particles will fall out of the flue gas once the flow has been slowed by the flue gas cleaning system.

II. Industrial External Heater Assembly

As described above, some embodiments can include an external heater assembly 300 arranged at least partially outside of the flue (referred to herein as an external heater or external heater assembly) that contains a dosing solution injector 500 to create a vapor 172 to aid in the industrial filtration system and a heating element 320 for heating the dosing solution. The external heater assembly 300 can have one or more pressure sensors, such as pressure sensor 620 as described above, to ensure that the dosing solution fluid pressure is sufficient to create a mist within the external heater assembly 300. The control panel 800 can detect solution pressure at various sensors and adjust the amount of pressure generated by the dosing solution pump. One or more heating elements 320 may be included in the external heater assembly 300 to vaporize the dosing solution. In some embodiments, the heating elements 320 can include a coiled resistance heating alloy wire (e.g., heating coils 320), however, this configuration is not limiting. The heating elements 320 of the external heater assembly 300 may be different sizes or arranged in different configurations to more evenly distribute the dosing solution vapor 172. Having multiple external heater assemblies 300 can be beneficial because it will avoid providing excessive heat to the flue and avoid degradation of the filter.

The external heater assembly 300 may include input and output valves for the dosing solution. This allows for a constant pressure for the dosing solution and a constant density of vapor 172 within the industrial filtration system. A controller (e.g., a component of control panel 800) may vary the pressure of the dosing solution if the vapor 172 becomes too dense or too thin. The controller may also adjust the heat depending on data received from temperature and gas sensors to reduce emissions efficiently. In some embodiments, there may be multiple external heater assemblies 300.

The illustrated embodiments include a heating element 320 that uses a coiled resistance heating wire, but other arrangements are possible, such as a planar, circular, or square heating element. The coiled resistance may be advantageous because it can provide relatively equal amounts of heat down the flow path of the dosing solution mist as it is converted into a vapor 172.

III. Industrial Dosing System

The industrial filtration system according to some embodiments comprise a dosing solution supply tank 100 to store a dosing solution. The dosing solution comprises a nitrogen portion and an aqueous portion. Dosing solutions according to some embodiments comprise 25-35% w/v of the nitrogen portion and 65-75% w/v the aqueous portion, comprise 30-35% w/v of the nitrogen portion and 65-70% w/v the aqueous portion, or 30% w/v of the nitrogen portion and 70% w/v of the aqueous portion. The aqueous portion optionally comprises 3.0-4.0% w/v of a salt, such as sodium chloride. The saltwater concentration of the dosing solution varies based on the application. The dosing solution has higher salt concentrations for larger exhaust systems.

Preferably, the aqueous portion comprises 3.5% w/v of a salt. In preferred embodiments, the nitrogen portion comprises urea or ammonia. In one embodiment, the dosing solution comprises 30-35% w/v urea and 65-70% w/v demineralized water. When the dosing solution comprises urea, the dosing solution preferably comprises, for example, 30% w/v ammonia and 70% of an aqueous portion comprising 3.5% sodium chloride.

The dosing solution is stored in the dosing solution supply tank 100. The dosing solution supply tank 100 is fitted with an alert system X to monitor the amount of dosing solution in the dosing solution supply tank 100. When the amount of dosing solution in the dosing solution supply tank 100 is low, the alert system X alerts the user to add more dosing solution to the dosing solution supply tank 100. The dosing solution supply tank 100 stores from 1,000 to 5,000 gallons of dosing solution. In exemplary embodiments, the dosing solution supply tank 100 stores 1,000, 2,000 or 5,000 gallons of dosing solution.

The dosing solution supply tank 100 may include a mixer 106 to mix the dosing solution. In preferred embodiments, the means for mixing the dosing solution is a rotation system to rotate the tank. The mixing prevents separation of the nitrogen portion from the aqueous portion of the dosing solution. The dosing solution supply tank 100 can mix the dosing solution periodically. For example, the dosing solution is mixed for 5 to 10 minutes in 1-to-5-hour intervals. In preferred embodiments, the dosing solution supply tank 100 mixes the dosing solution for 10 minutes every 1 hour. Meaning the dosing solution is mixed for 10 minutes and not mixed for 50 minutes. The dosing solution can also be mixed at longer intervals of 3 hours or 5 hours to prevent separation of the nitrogen portion from the aqueous portion of the dosing solution. The frequency of mixing is based on the salt concentration of the dosing solution.

The dosing solution supply tank 100 is supplied with at least one heater to maintain the temperature of the dosing solution inside the dosing solution supply tank 100 at a predetermined temperature. The tank heater maintains the dosing solution at a constant temperature inside the dosing solution supply tank 100. The temperature of the dosing solution supply tank 100 is maintained above the freezing point of the dosing solution. The dosing solution supply tank 100 may also include a level indicator 105 connected to the control panel 800, such that the control panel can generate a warning if the dosing agent in the dosing solution supply tank 100 drops below a predetermined level.

Dosing tubing 600 is connected to the dosing solution supply tank 100. The dosing solution leaves the dosing solution supply tank 100 via dosing tubing 600 to the flue. The dosing tubing 600 is fitted with pressure sensors 620 to maintain the pressure of the dosing solution as it travels through the dosing tubing. The temperature and pressure are kept constant to keep the dosing solution in the liquid state. In exemplary embodiments, the dosing solution travels from the flue to the dosing supply tank. Pressure valves 640 maintain the pressure and flow direction of the dosing solution in the dosing tubing 600. For example, when the pressure is below 60 psi, the dosing solution flows from the flue to the dosing solution supply tank 100. The dosing solution directionally flows from the dosing supply tank to the flue when the pressure is from 60 psi to 120 psi, 70 psi to 110 psi, 80 psi to 100 psi, 90 psi to 100 psi or 95 psi to 100 psi. Optionally, the dosing solution pump 650 automatically shuts off, such as by using an automatic shutoff system, when the pressure in the dosing tubing 600 is below a predetermined level, such as 60 psi. The dosing solution pump 650 may be configured to pump dosing solution at a predetermined flow rate or pressure.

Figure 9:
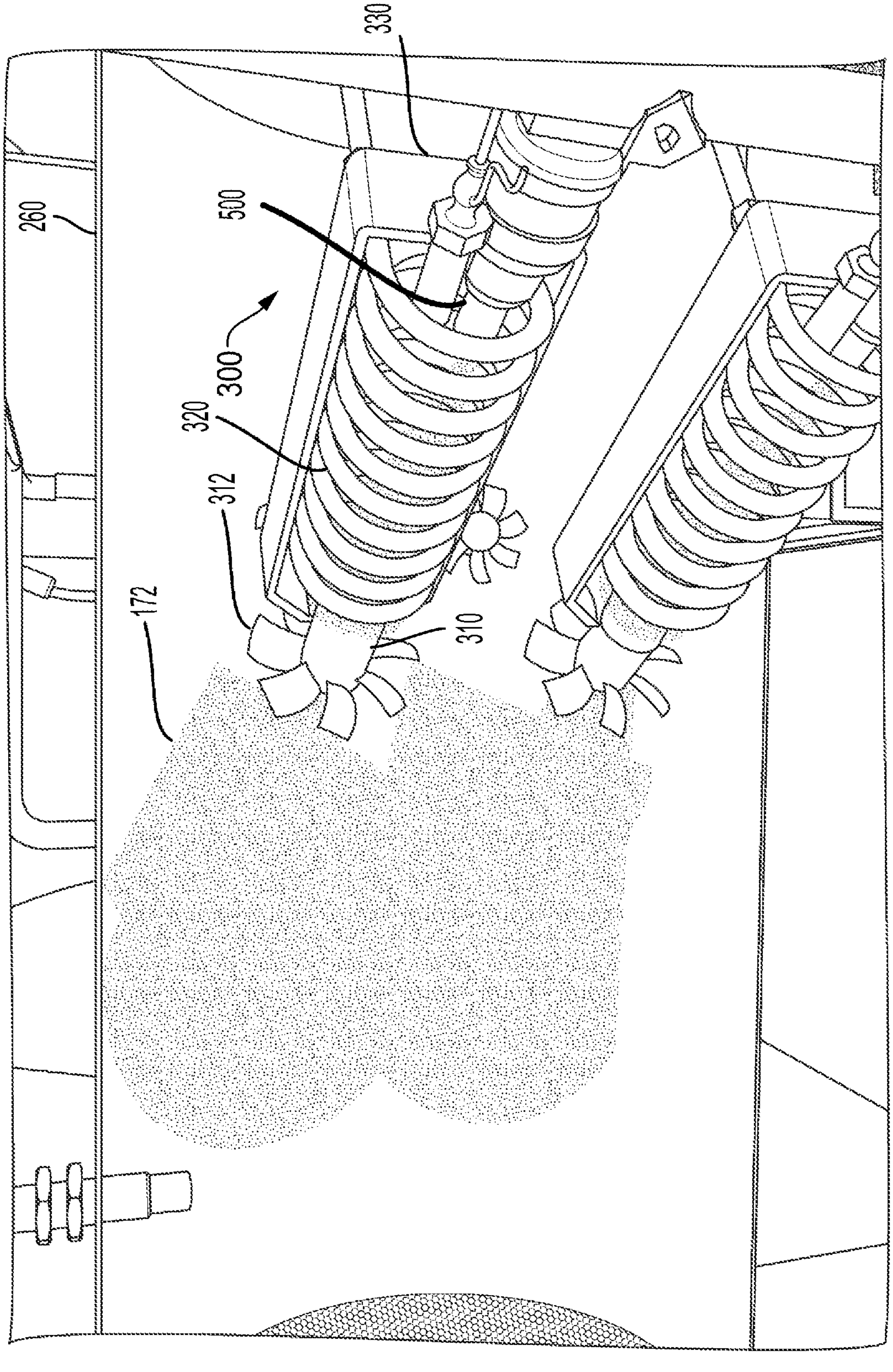
FIG. 9 illustrates a cutaway perspective of an external heater assembly in accordance with some embodiments of the present disclosure.

The dosing tubing 600 is connected to at least one dosing solution injector 500 that is part of or coupled to the external heater assembly 300, as described further in FIG. 9. The dosing solution is then heated by the external heater assembly 300. The external heater assembly 300 converts the heated dosing solution from a liquid state to vapor 172 by heating the dosing solution to 400 to 800° C., 450 to 800° C., 500 to 700° C., or 600 to 650° C. The external heater assembly 300 is also coupled to a return tubing (not illustrated). The return tubing (not illustrated) can be fitted with at least one pressure valve 640. If the pressure of the dosing solution is below 60 psi, the dosing solution travels through a return to the dosing tubing 600 back to the dosing solution supply tank 100.

The dosing solution enters the flue in the vapor state. The SCR filter 154 aids in removing pollutants, such as $SO_2$ and NOx. The dosing solution is capable of continuously reducing NOx emissions, even in an oxygen rich environment. The dosing solution use gaseous ammonia and/or urea as the active NOx reducing agent. The heat in the dosing solution gas causes the dosing solution to decompose into ammonia and hydro-cyanic acid (HNCO). These decomposition products enter the SCR filter 154 where the gas phase ammonia is adsorbed, and the cyanic acid is further decomposed on the SCR to gas phase ammonia. The adsorbed ammonia then takes part in the reduction of gas phase NOx.

The urea solution atomizes and dissolves as ammonia and carbon dioxide at high temperatures. The reactions are described below.

$$(NH_2)_2CO_2 \rightarrow HNCO+NH_3$$

$$HNCO+H_2O \rightarrow NH_3+CO_2.$$

The gaseous ammonia reacts with NOx to produce nitrogen and water as shown below.

$$4NH_3+4NO+O_2 \rightarrow 4N_2+6H_2O$$

$$8NH_3+6NO_2 \rightarrow 7N_2+12H_2O$$

$$4NH_3+2NO_2+O_2 \rightarrow 3N_2+6H_2O.$$

The SCR filter 154 is optionally equipped with an active metal site for the NOx reduction process. The active metal can be, for example, any metal catalyst. Metals catalysts compatible with the SCR filter 154 according to some embodiments include titanium, vanadium, molybdenum, iron, tungsten, tin, manganese, copper, and their oxides. The compatible oxides include $V_2O_5$, $MoO_3$, $WO_3$, $Fe_2O_3$, $CuSO_4$, $VOSO_4$, $SnO_2$, $Mn_2O_3$, $Mn_3O_4$, and $TiO_2$. The catalyst is selected based on the temperature of the SCR filter 154. The SCR filter 154 causes oxidation of sulfur dioxide ($SiO_2$) to sulfur trioxide ($SiO_3$). The resulting gas continues upstream in the flue housing 260 and through heater unit 155 and particulate filter 251.

The embodiment illustrated in FIG. 1 further includes a heater unit 155, and combined oxidation and particulate filter 252 (or diesel particulate filter (DPF)) and SCR filter 254, which can be the same as 152 and 154. Some embodiments can allow the flue housing 260 to include openings to remove the various filters and other components for cleaning, repair, or replacement. The control panel 800 can detect that emission results are changing by, for example, detecting higher levels of pollution at gas sensor 400, and diagnose that one or more of the components needs cleaning or replacement.

The flue housing 260 is fitted with the magnet unit 160. The magnet unit 160 is optionally insulated from the flue 270 to prevent overheating of the magnet unit 160. In some configurations, at least one magnet unit (e.g., in a configuration with multiple magnet units) is positioned outside the flue 270. The magnet unit 160, separates the particulates in the flue chamber, and they are filtered from the exhaust gas by the at least one particulate filter 251. In a preferred embodiment, the particulate filter 251 is a ceramic filter. Optionally, the flue comprises a first heater unit 150, an insulated magnetic plate on top of the heater, a gas chamber inside the flue positioned above the insulated magnet unit 160, a second insulated magnet on top of the gas chamber, and a second heater unit on top of the second insulated magnet. The flue is optionally fitted with a particulate filter 251. The particulate levels are measured and monitored by the control panel 800 and displayed by the control panel computer and display interface 810.

The flue 270 may further comprise one or more temperature sensors 450 and gas composition sensor 400, which are coupled to the control panel 800. The control panel 800 may monitor the information received from the sensors and adjust the amount of heat placed into them by the system to ensure efficient emission control. Having more sensors can increase the complexity of the system but can allow for more efficient control.

Figure 7:
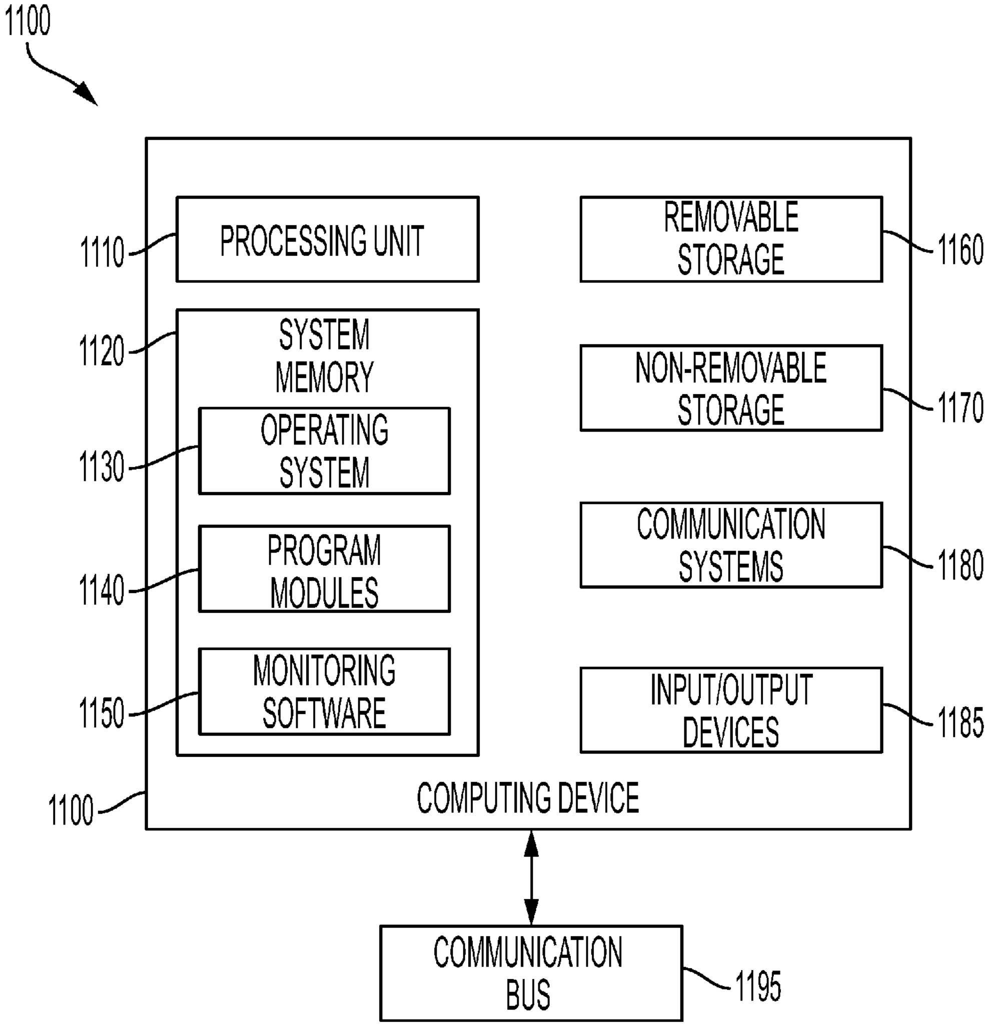
FIG. 7 illustrates a system diagram of a computing device that may be integrated or otherwise associated with controlling embodiments comprising a system of elements for controlling reduction of pollution in accordance with some embodiments of the present disclosure.

FIG. 7 illustrates a system diagram of a computing device that may be integrated or otherwise associated with controlling embodiments comprising a system of elements for controlling reduction of pollution. The computing device 1100 may be integrated with or associated with a various system components described herein. As shown in FIG. 7, the physical components (e.g., hardware) of the computing are illustrated and these physical components may be used to practice the various aspects of the present disclosure.

The computing device 1100 may include at least one processing unit 1110 and a system memory 1120. The system memory 1120 may include, but is not limited to, volatile storage (e.g., random access memory), non-volatile storage (e.g., read-only memory), flash memory, or any combination of such memories. The system memory 1120 may also include an operating system 1130 that controls the operation of the computing device 1100 and one or more program modules 1140. The program modules 1140 may be responsible for gathering or determining expected pollution, operating conditions, and the like. The system memory 1120 may also store and/or monitoring software 1150 to monitory the pollution control system, as described herein. Several different program modules and data files may be stored in the system memory 1120, including operating state information. While executing on the processing unit 1110, the program modules 1140 may perform the various processes described above.

The computing device 1100 may also have additional features or functionality. For example, the computing device 1100 may include additional data storage devices (e.g., removable and/or non-removable storage devices) such as, for example, magnetic disks, optical disks, or tape. These additional storage devices are labeled as a removable storage 1160 and a non-removable storage 1170.

Embodiments of the disclosure may be practiced with one or more processors comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 1100 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the flue system and/or in any other circuits or systems.

The computing device 1100 may include one or more communication systems 1180 that control if inputs and outputs of the pollution control system, other computing devices 1195, a network service and the like. Examples of communication systems 1180 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 1100 may also have one or more input devices and/or one or more output devices shown as input/output devices 1185. These input/output devices 1185 may include a keyboard, buttons, switches, a sound or voice input device, haptic devices, a touch, force and/or swipe input device, a display, speakers, etc. The devices are examples and others may be used.

The computing device 1100 may also include one or more sensors as input devices 1185. The sensors may be used to detect or otherwise provide information about the operating condition of the computing device 1100. In other examples, the sensors may provide information about whether the pollution control system is operating correctly and/or is being used correctly via Diagnostics Trouble Code DTCs (e.g., sensors sending signals to the CAN-bus indicating whether pollution levels are within specified requirements). As discussed previously, the sensors can include gas, pressure, and temperatures sensors.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1120, the removable storage 1160, and the non-removable storage 1170 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
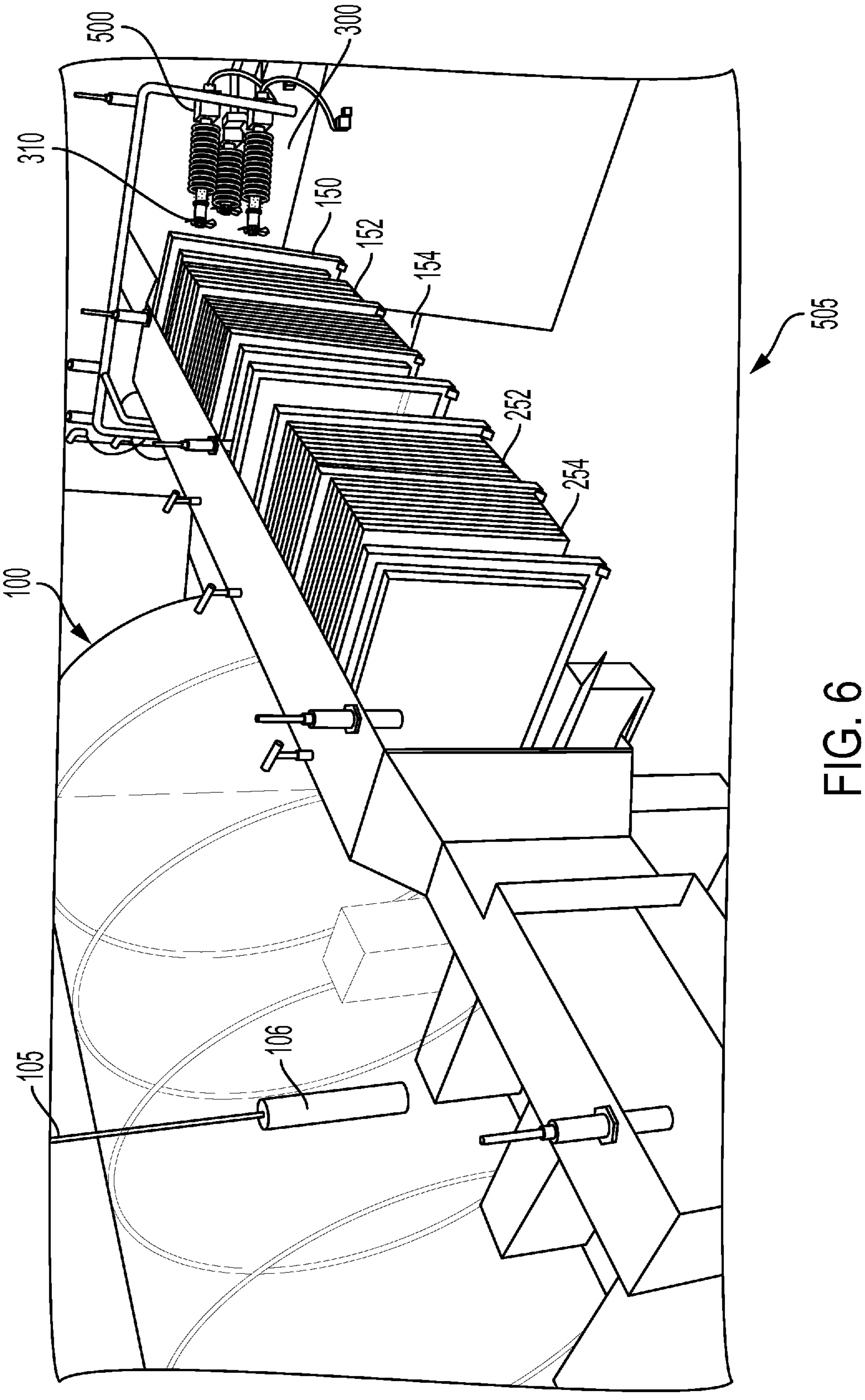
FIG. 6 illustrates a second perspective view of the horizontal configuration illustrated in FIG. 5 in accordance with some embodiments in accordance with some embodiments of the present disclosure.
Figure 8:
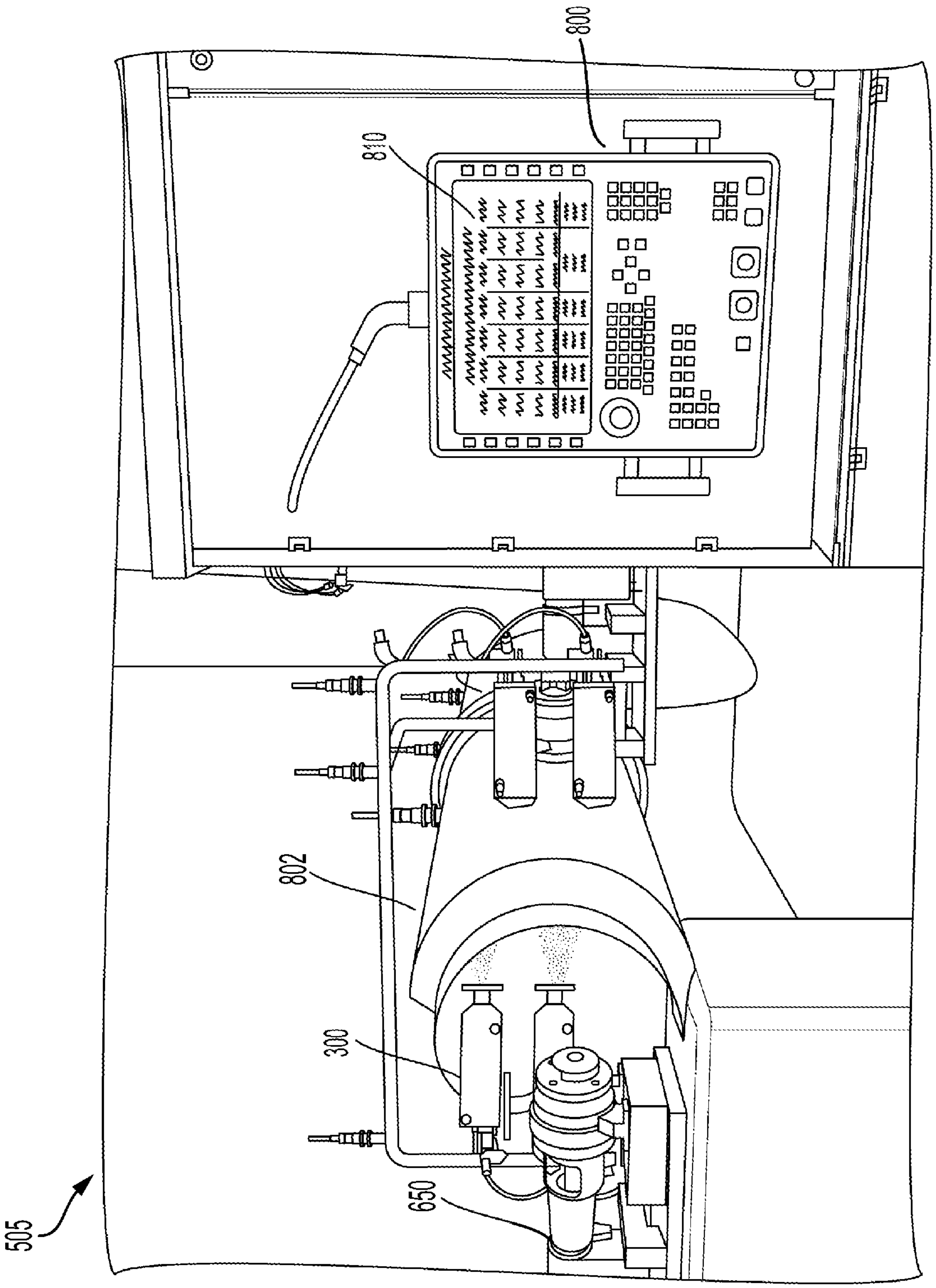
FIG. 8 illustrates a third perspective view of the horizontal configuration illustrated in FIGS. 5-6 in accordance with some embodiments of the present disclosure.

FIG. 8 illustrates a third perspective view of the horizontal configuration illustrated in FIGS. 5-6 in accordance with some embodiments of the present disclosure. As illustrated by FIG. 8, the flue system 505 includes the pump 650, the external heater assembly 300, flue 802, control panel 800 and control panel computer and display interface 810. Each of these components of the flue system 505 are similar to as described above.

FIG. 9 illustrates a cutaway perspective of an external heater assembly in accordance with some embodiments of the present disclosure. As illustrated by FIG. 9, the external heater assembly 300 includes the dosing solution injector 500, heating elements 320, the extending blade 312, the divider 310, and the heater housing 330. The housing can be used to contain the dosing solution and heat used to convert the dosing solution/agent into a vapor before being distributed into the SCR reaction chamber by divider 310. Converting the dosing solution/agent into a vapor can prevent cracking and burning of the SCR and other components. A portion of one or more of the heating elements 320 may be placed partially into the flue housing 260 depending on whether that aids in creating a generally consistent vapor level within the SCR reaction chamber. The coils can be arranged in different orientations, angles and distances inside of the flue housing 260 to generate a relatively uniform vapor mist. Furthermore, some embodiments can include placing the external heater completely inside the flue housing 260. Each of these components are similar to as described above.

IV. Vehicle Exhaust Systems

According to certain aspects of the disclosure, systems and methods are disclosed for improving removal and/or reduction of harmful exhaust gases, particulate matters, and other debris from an exhaust system, including vehicle exhaust systems. Examples of such systems are described below with respect to FIGS. 10-17. Other examples of vehicle exhaust systems are described in PCT/US22/40366, filed on Aug. 15, 2022, which claims priority to U.S. Provisional Application No. 63/233,019 filed on Aug. 13, 2021, under 35 U.S.C. § 119(e), the entire contents of all of which are hereby incorporated by reference. It is understood that such exhaust systems may be for automobiles, motorcycles, trucks, two-stroke engine vehicles, marine vessels, aircraft, locomotives, and the like.

Figure 10:
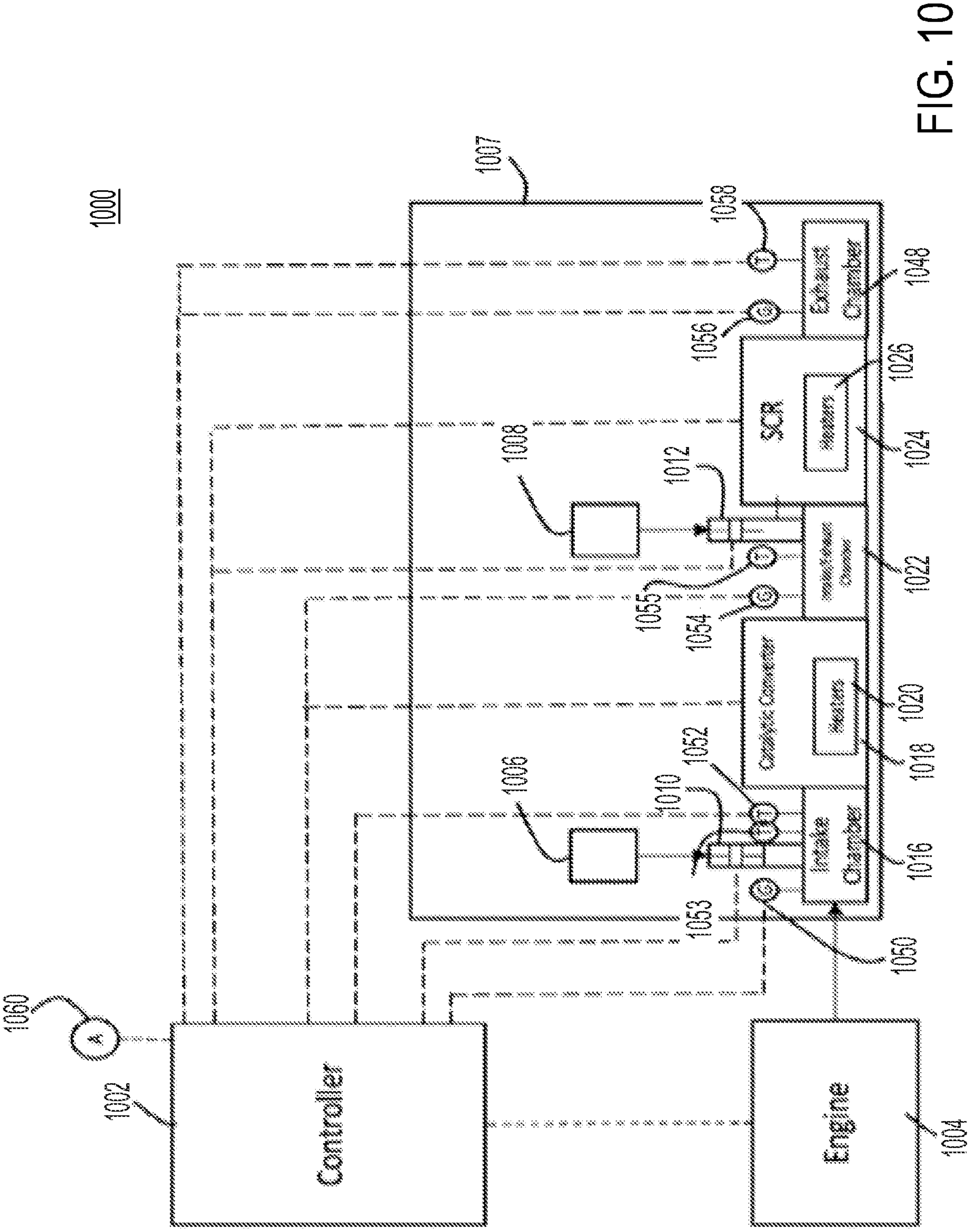
FIG. 10 shows an exemplary exhaust system, according to one or more embodiments of the present disclosure.

FIG. 10 shows an exhaust system 1000 according to an embodiment of the present disclosure. The exhaust system 1000 may include a controller 1002 coupled to an exhaust converter system 1007. The exhaust converter system 1007 may be coupled to an engine 1004 that may generate harmful gases and particulate matters, for example, due to an internal combustion of fossil fuel by the engine 1004. The controller 1002 may be electrically coupled to the engine 1004 and the exhaust converter system 1007. The controller 1002 may be configured to receive various signals and/or data from the engine 1004 and the exhaust converter system 1007 to facilitate controlling of the engine 1004 and the exhaust converter system 1007 to sufficiently operate a vehicle or a machine.

In one embodiment, the exhaust converter system 1007 may include an intake chamber 1016 coupled to the engine 1004 to communicate exhaust gases from the engine 1004 to a catalytic converter 1018. The catalytic converter 1018 may include one or more heaters 1020 and other components associated with a catalytic converter, as described, for example, in PCT/US22/40366. The exhaust converter system 1007 may further include an intake/exhaust chamber 1022 to communicate filtered (or converted) and/or reduced gases down to a selective reduction catalyst filtering system (SCR) 1024. The SCR 1024 may include one or more heaters 1026 and other components associated with the SCR, as described, for example, in PCT/US22/40366. Further, the exhaust converter system 1007 may include an exhaust chamber 1048 that may be coupled to a muffler (not shown for clarity of illustration and description).

In one embodiment, the exhaust converter system 1007 may include gas sensors 1050, 1054, 1056. For example, the gas sensor 1050 may be coupled to the intake chamber 1016, the gas sensor 1054 may be couple to the intake/exhaust chamber 1022, and the gas sensor 1056 may be coupled to the exhaust chamber 1048. The gas sensors 1050, 1054, 1056 may include, for example, an oxygen (e.g., $O_2$) sensor, but are not limited thereto and any suitable gas sensor may be utilized based on the desired application of the exhaust system 1000. Additionally, the exhaust converter system 1007 may include temperature sensors 1052, 1053, 1055, 1058, and dosing injectors 1010, 1012 coupled to dosing solution tank 1006, 1008 for injecting or pumping a dosing solution, such as a urea, salt water, or ammonia solution, among other possible solutions, to the exhaust flow gas. The gas sensor 1050 may be arranged before the catalytic converter 1018, and the gas sensor 1054 may be arranged between the catalytic converter 1018 and the SCR 1024.

The controller 1002 may receive signals from the temperature sensor 1052 to controls the heater 1020. Further, the controller 1002 may receive signals from the temperature sensor 1053 to control the dosing injector 1010. For example, when a predetermined temperature in the catalytic converter 1018 is detected by the temperature sensor 1053, the controller 1002 may send command signals to the dosing injector 1010 to inject or shoot dosing solution into the catalytic converter 1018. In one embodiment, the dosing injector 1010 may continuously inject dosing solution supplied by the dosing solution tank 1006 into the catalytic converter 1018 at a predetermined interval if the temperature sensor 1053 detects that a predetermined temperature is maintained. Alternatively, the temperature sensor 1053 may be configured to detect a predetermined temperature range, for example, about 340 to 410 degrees Celsius. In other words, the dosing solution injected into the catalytic converter 1018 at the predetermined temperature or the predetermined temperature range may improve reduction or removal of harmful gases (e.g., NOx, etc.) in the catalytic converter 1018.

In one embodiment, the gas sensor 1050 may detect the condition or state of the exhaust gas in the intake chamber 1016, and the gas sensor 1054 may detect the condition or state of the exhaust gas in the intake/exhaust chamber 1022. That is, the gas sensors 1050, 1054 may transmit data related to the condition or state of the exhaust gas to the controller 1002. Accordingly, the controller 1002 may utilize the received gas data to monitor the effectiveness of the catalytic converter 1018 and to perform appropriate functions to achieve desirable performance of the catalytic converter 1018. Further, the controller 1002 may utilize the received gas data and display the gas monitoring information on one or more displays coupled to the exhaust system 1000. In one embodiment, the controller 1002 may automatically control the engine 1004 and/or the exhaust converter system 1007 to achieve desired performance and and/or functionality of the exhaust system 1000. In another embodiment, an operator of the exhaust system 1000 may manually control the engine 1004 and/or the exhaust converter system 1007 to achieve desired performance and/or functionality of the exhaust system 1000 based on the gas and/or temperature monitoring data displayed on the display coupled to the exhaust system 1000. In yet another embodiment, the exhaust system 1000 may be controlled both automatically and manually.

In one embodiment, the temperature sensor 1052 may detect the internal temperature of the catalytic converter 1018. The controller 1002 may utilize the temperature data received from the temperature sensor 1052 to control the heater 1020. That is, the controller 1002 may control the heater 1020 to maintain a desired temperature inside of the catalytic converter 1018 to achieve desired performance (e.g., sufficient reduction of harmful exhaust gases and particulate matters) and/or functionality of the catalytic converter 1018.

In one embodiment, the SCR 1024 may be controlled in the similar manner as described in relation to the catalytic converter 1018. That is, the controller 1002 may receive signals from the gas sensors 1054, 1056 and the temperature sensors 1055, 1058 to control the dosing injector 1012 and the heaters 1026, similarly to controlling the catalytic converter 1018 as described, for example in PCT/US22/40366, to achieve desired performance and/or functionality of the SCR 1024. In some embodiments, more than one SCR may be utilized in the exhaust converter system 1007 to further reduce or remove the harmful exhaust gases and particulate matters.

In one embodiment, the controller 1002 may receive data from an altitude sensor 1060. The altitude sensor 1060 may be mounted on any suitable location of a vehicle. Since the level of altitude may offset the pressures within the engine and the exhaust converter system 1007, the controller 1002 may perform appropriate functions to offset the pressure variance caused by the change in altitude. For example, at relatively higher altitude the exhaust system 1000 may intake relatively less oxygen in the engine 1004. Accordingly, the controller 1002 may transmit control signals to adjust a throttle position switch to introduce additional air into the engine 1004. The change in altitude may affect fuel efficiency as well as air pressure in the engine. That is, at a relatively higher altitude level, the engine may burn less gas. Further, relatively less air with more fuel may cause damage, for example, to the catalytic converter 1018. As such, the controller 1002 may transmit appropriate signals to various components (e.g., throttle position switch, heaters, etc.).

Figure 11:
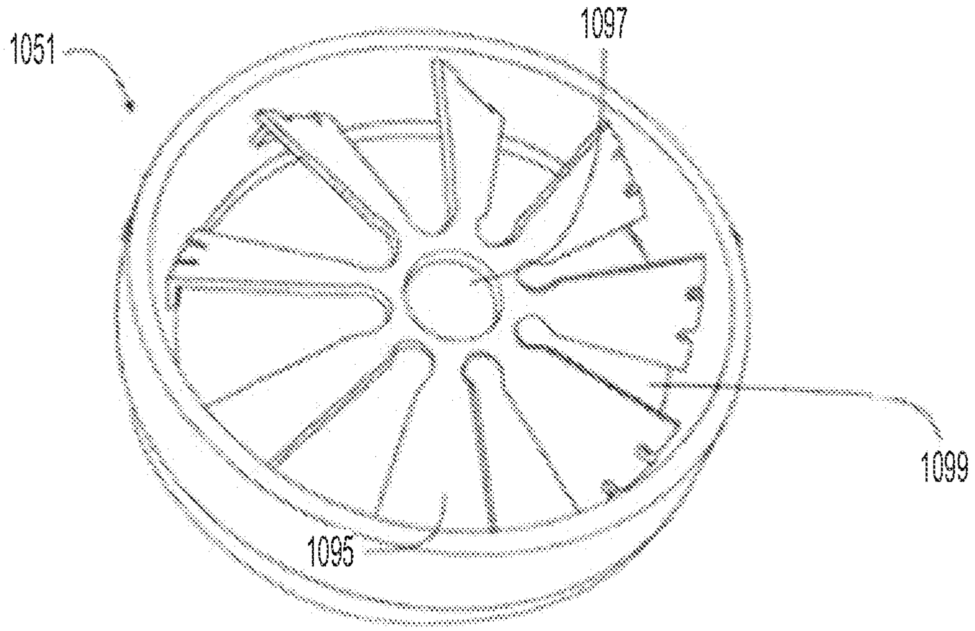
FIG. 11 shows an exemplary dosing solution distributor, according to one or more embodiments of the present disclosure.

FIG. 11 shows an exemplary dosing solution distributor 1051 according to an embodiment of the present disclosure. The dosing solution distributor 1051 is located downstream of one or more dosing injectors 1010, 1012. The one or more dosing solution distributors 1051 may be located between the dosing injectors 1010, 1012 and the catalytic converter 1018 and the SCR 1024, respectively. The dosing solution distributor 1051 may include a plurality of wings (or plates) 1095 disposed at a predetermined distance from each other.

Further, the dosing solution distributor 1051 may include a plurality of openings 1099 between each of the wings 1095, and a circular aperture 1097 at the center of the dosing solution distributor 1051, as shown in FIG. 11. The dosing solution distributor 1051 prevents deterioration (e.g., cracking) of a honeycomb filter in a catalytic converter and/or an SCR by evenly distributing the dosing solution sprayed by the dosing injectors 1010, 1012. In one embodiment, each of the wings 1095 may be angled at a predetermined angle to give a turbine effect and to distribute the dosing solution evenly to the filter of a catalytic converter and/or an SCR. The shape, size, and number of the wings 1095 are not limited thereto, and may be varied according to the desired application or performance of the dosing solution distributor 1051.

Figure 12:
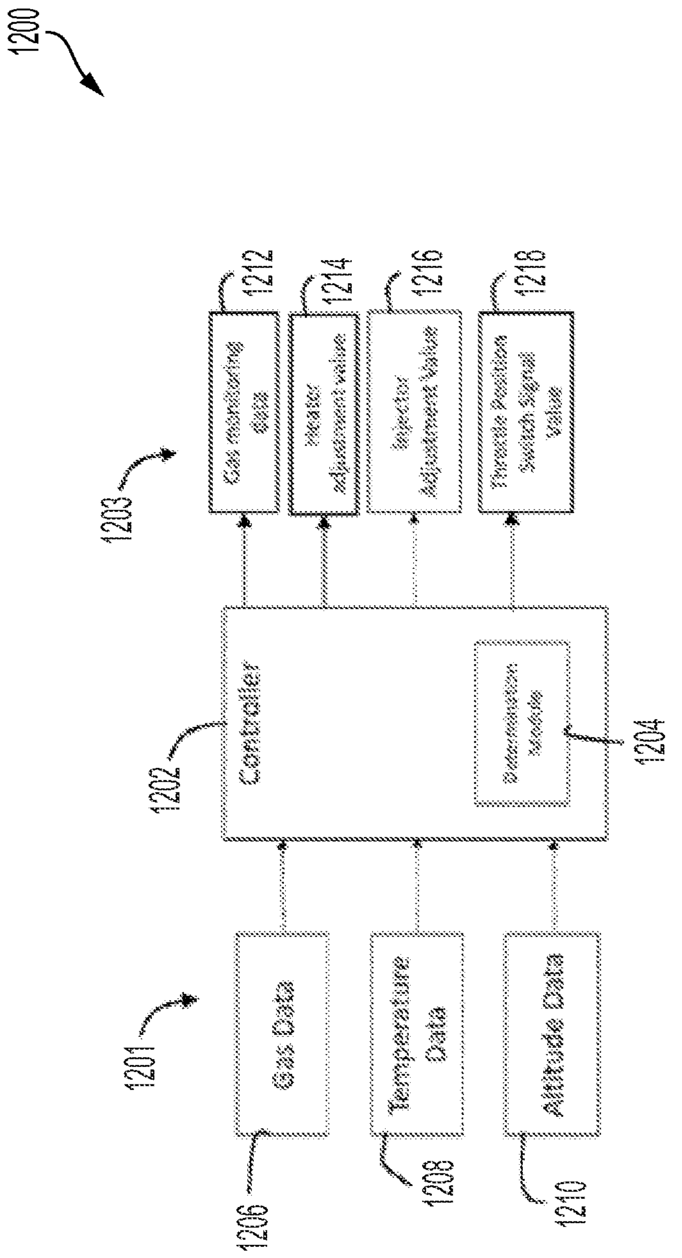
FIG. 12 shows a schematic view of an exemplary exhaust control system, according to one or more embodiments of the present disclosure.

FIG. 12 illustrates a schematic view of an exemplary exhaust control system 1200 for operation and/or control of an exhaust system according to an embodiment of the present disclosure. The exhaust control system 1200 may include a plurality of inputs 1201, for example, gas data 1206, temperature data 1208, and altitude data 1210, a controller 1202, and a plurality of outputs 1203, for example, gas monitoring data 1212, heater adjustment value 1214, injector adjustment value 1216, and throttle position switch signal value 1218.

The controller 1202 may include a determination module 1204, a memory, a secondary storage device, and a processor, such as a central processing unit or any other means for accomplishing a task consistent with the present disclosure. The memory or secondary storage device associated with the controller 1202 may include non-transitory computer-readable media and may store data and/or software routines that assist controller 1202 in performing its functions, such as the process disclosed in relation to the exhaust system 1000 of FIG. 10.

Further, the memory or secondary storage device associated with the controller 1202 may store data received from various inputs associated with the sensors disclosed in the exhaust system 1000 or other systems of the present disclosure. Commercially available microprocessors may be configured to perform the functions of the controller 1202. It should be appreciated that the controller 1202, could readily embody a general machine controller capable of controlling numerous other machine functions. Various other known circuits may be associated with controller 1202, including signal-conditioning circuitry, communication circuitry, actuation circuitry, and other appropriate circuitry.

In one embodiment, the controller 1202 may control one or more heaters (e.g., heaters 1020, 1026). For example, based on the temperature data 1208 received from one or more temperature sensors (e.g., temperatures sensors 1053, 1052, 1058), the determination module may calculate or determine a heater adjustment value 1214. The controller 1202 may then transmit the heater adjustment value 1214 to control the one or more heaters (e.g., heaters 1020, 1026) in accordance with the foregoing embodiments of the present disclosure.

In one embodiment, the controller 1202 may control one or more dosing injectors 1010, 1012. For example, based on the temperature data 1208, the determination module 1204 may calculate or determine an injector adjustment value 1216. The controller 1202 may then transmit the injector adjustment value 1216 to control to the one or more dosing injectors 1010, 1012 in accordance with the foregoing embodiments of the present disclosure. In one embodiment, the determination module 1204 may utilize the altitude data 1210, to calculate or determine the throttle position switch signal value 1218. The controller 1202 may then control a throttle position switch in accordance with the foregoing embodiments of the present disclosure. In one embodiment, the determination module 1204 may generate gas monitoring data 1212 based on gas data 1206 received from one or more gas sensors (e.g., 1050, 1054, 1056). For example, the determination module may compare the amount gas detected by the gas sensor 1050 and the gas sensor 1054. The determination module may then generate gas monitoring data 1212. The controller 1202 may then transmit the gas monitoring data 1212 to a display according to the foregoing embodiments according to the present disclosure. In some embodiments, the determination module 1204 may utilize gas data 1206, temperature data 1207, and altitude data 1210 simultaneously or sequentially to determine appropriate data and values for controlling the heaters, injectors, throttle position switches, and/or displays in accordance with the embodiments of the present disclosure. Accordingly, the controller 1202 may be configured to facilitate automatic and/or manual control of the heaters, injectors, throttle position switches, and/or displays according to the embodiments of the present disclosure.

In one embodiment, a catalytic converter (e.g., as described above or in PCT/US22/40366) may be placed or arranged so that exhaust gases may flow from one or more inlet ports according to the foregoing embodiments through one or more disruptor plates (in some embodiments) of the foregoing embodiments, and through one or more heaters or heating elements of the foregoing embodiments. Additionally, the exhaust gases may be additionally heated in some embodiments by one or more additional heaters and subjected to magnetic fields by the magnets of the foregoing embodiments. The additional heaters and/or magnetic fields may interact with the individual molecules and ions of the gases passing through catalytic converters and increase the efficiency of catalytic conversion that takes place before exiting a catalytic converter. In addition to heaters being included within a catalytic converter, the heaters may be added to existing catalytic converters on a vehicle or a machine.

According to testing results, exhaust systems equipped or modified according to the foregoing embodiments of the present disclosure resulted in carbon emissions, waste gases (NOx, CO, etc.) and particulate matters reduction by, about, 95-99% in gasoline powered cars and 90-97% in diesel power cars.

Figure 13:
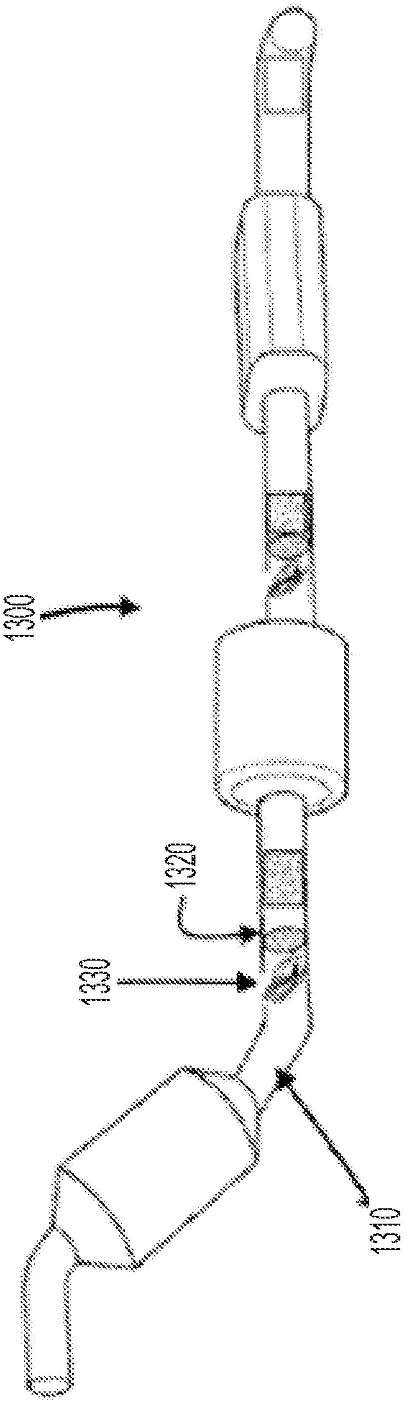
FIGS. 13 and 14 are assembly views of an exhaust system having an exhaust pipe heater, according to one or more embodiments of the present disclosure.
Figure 14:
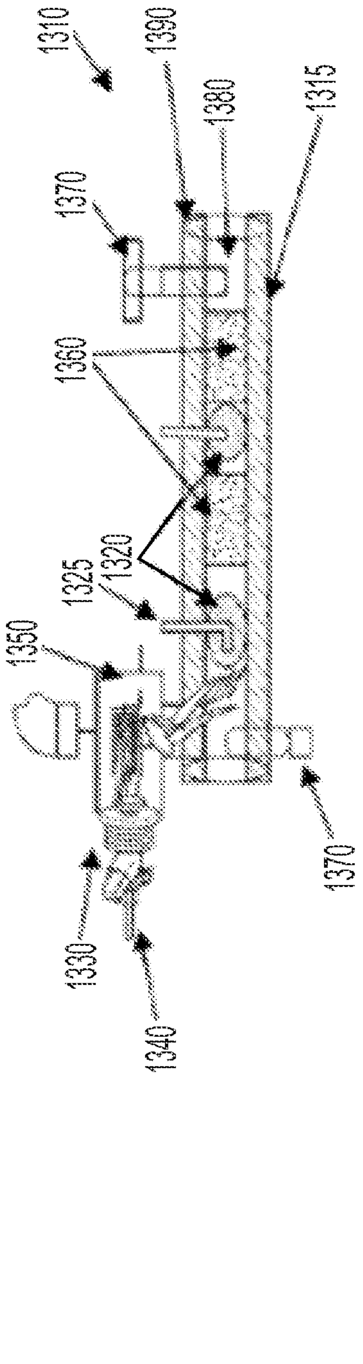

According to another embodiment of the invention, one or more exhaust pipe heaters 1320 may be attached to or disposed inside one or more of various exhaust pipes 1310 (e.g., connection pipes, extension pipes, etc.) of an exhaust system 1300 (herein, "exhaust pipe heater"), such as shown in FIGS. 13 and 14. The exhaust pipes 1310 may be made from aluminized or stainless steel.

For example, in an exhaust system 1300 for a gasoline powered engine, one or more exhaust pipe heaters 1320 may be disposed inside the exhaust pipe 1310 at a location that is before the inlet port of the catalytic converter, between the catalytic converter and the SCR, and/or between the SCR and the muffler. Similarly, in an exhaust system 1300 for a diesel powered engine, one or more exhaust pipe heaters 1320 may be disposed within the exhaust pipe 1310 at a location that is before the diesel oxidation catalyst, between the diesel oxygen catalyst and the DPF, and/or between the DPF and the SCR.

The exhaust pipe heaters 1320 may receive power from a power supply (not shown) via an electrical connector 1325. The exhaust pipe heaters may be separately powered via separate electrical connectors 1325 or powered together via a single electrical connector 1325. In a gasoline or diesel powered vehicle, the exhaust pipe heaters 1320 may be electrically connected to and powered by the vehicle's primary battery (not shown) or alternatively a secondary battery (not shown) via one or more electrical connectors 1325.

The exhaust pipe heaters 1320 can be installed within an existing exhaust pipe 1310 of an exhaust system 1300 or as part of a replacement exhaust pipe 1310 for an existing exhaust system. For example, the replacement exhaust pipe 1310 having the one or more exhaust pipe heaters 1320 may be connected to the exhaust manifold, the catalytic converter, the SCR, and/or the muffler of the exhaust system 1300. It is understood that some catalytic converters are integrated into the exhaust manifold.

As shown in FIGS. 13 and 14, the exhaust pipe 1310 may further comprise a dosing system 1330. The dosing system 1330 may include a dosing injector 1340 (such as dosing injectors 1010, 1012 described above) coupled to a dosing solution tank 1350 (such as dosing solution tanks 1006, 1008 described above) for injecting or pumping a dosing solution, such as a urea, salt water, or ammonia solution, among other possible solutions, to the exhaust flow gas. The exhaust pipe 1310 may further include one or more gas sensors 1370 (such as gas sensors 1050, 1054, 1056 described above). Additionally, the exhaust pipe may include a temperature sensor (such as temperature sensors 1052, 1053, 1055, 1058 described above), The dosing solution may be injected into the exhaust pipe 1310 at a predetermined temperature or a predetermined temperature range to further improve reduction or removal of harmful gases (e.g., NOx, etc.) in the exhaust pipe 1310.

Accordingly, as discussed above, a controller (such as controller 1002 described above or the control system 1800 of FIG. 18) (not shown) may receive signals from the gas sensors 1370 and/or temperature sensor to control an amount of current supplied to the heater and the timing in which the current is supplied to the exhaust pipe heater 1320 based on the received signals. Additionally, the dosing system 1330 may receive signals from the controller to control a timing and a duration of the dosing solution spray based on signals received from the one or more sensors. For example, when a predetermined temperature in the exhaust pipe 1310 is detected by the temperature sensor, the controller may send command signals to the dosing injector to inject or shoot dosing solution into the exhaust pipe based on the detected temperature.

In one embodiment, the dosing injector 1340 may continuously inject dosing solution supplied by the dosing solution tank 1350 into the exhaust pipe 1310 at a predetermined interval if the temperature sensor detects that a predetermined temperature is maintained. Alternatively, the temperature sensor may be configured to detect a predetermined temperature range, for example, about 340 to 410 degrees Celsius. In other words, the dosing solution injected into the exhaust pipe 1310 at the predetermined temperature or the predetermined temperature range may improve reduction or removal of harmful gases (e.g., NOx, etc.) in the exhaust pipe 1310.

Additionally, the temperature sensor may detect the internal temperature of the exhaust pipe. The controller may utilize the temperature data received from the temperature sensor to control the exhaust pipe heater 1320. That is, the controller may control the exhaust pipe heater 1320 to maintain a desired temperature inside of the exhaust pipe 1310 to achieve desired performance (e.g., sufficient reduction of harmful exhaust gases and particulate matters) and/or functionality of the exhaust system.

Additionally, the exhaust pipe 1310 may include one or more located or arranged on or adjacent to an exterior surface 1315 of the exhaust pipe 1310. The magnets (not shown herein) may have a curved shape to approximate the outer geometry of the exhaust pipe and may be disposed in an array having alternating polarities (such as described in PCT/US22/40366). In one embodiment, the magnets facing each other may have opposing polarities. Alternatively, the magnets may have the same polarity and the polarity may not vary along the longitudinal or horizontal direction of the exhaust pipe 1310. Having magnets facing each other with opposite polarities results in a stronger magnetic field.

In one embodiment, the plurality of magnets may include one or more neodymium magnets. In another embodiment, the one or more magnets may be electromagnets. However, any suitable magnets may be used depending on the desired application. Additionally, the exhaust pipe 1310 may include an outer shell or an outer surface (e.g., tape, fastener, covering, etc.) (not shown) and one or more of the magnets may be arranged or disposed between an exterior surface of the exhaust pipe and the outer shell. Additionally, the exhaust pipe may comprise one or more filters 1360.

According to an embodiment, the exhaust pipe 1310 is configured to be coupled to an exhaust system component. The exhaust system component may include one or more of the following: an exhaust manifold, a catalytic converter, a selective catalytic reduction system (SCR), a diesel oxidation catalyst, a diesel particulate filter (DPF), a selective catalytic reduction system (SCR), and a muffler. The exhaust pipe 1310 may include an exhaust pipe heater 1320 disposed inside a cavity 1380 of the exhaust pipe 1310. The exhaust pipe heater 1320 may include a housing 1390, a heating wire disposed inside the housing, and an electrical connector 1325 attached to the housing and electrically connected to the heating wire. The electrical connector 1325 may be configured to receive power from a power supply (not shown) that is external from the exhaust pipe heater 1320 to supply electrical current to the heating wire. The exhaust pipe heater 1320 may be configured to heat gas inside the exhaust pipe 1310 to reduce toxic gases and/or particulate matter exiting the exhaust pipe 1310.

The exhaust pipe 1310 may further include one or more magnets arranged adjacent to an exterior surface 1315 of the exhaust pipe 1310 to aid in disruption and slowing of the flow of exhaust gases in the cavity 1380 of the exhaust pipe 1310. The exhaust pipe 1310 may further include a second surface (not shown) that is positioned outside of the exterior surface 1315 and the one or more magnets may be disposed between the second surface and the exterior surface 1315 of the exhaust pipe 1310. The second surface may be a surface of an exterior shell, an exterior casing, tape or other adhesive, a fastener, etc.

The exhaust pipe 1310 may include an exhaust pipe heater 1320 disposed inside a cavity 1380 of the exhaust pipe 1310. The exhaust pipe heater 1320 may include a housing 1390, a heating wire disposed inside the housing, and an electrical connector 1325 attached to the housing and electrically connected to the heating wire. The electrical connector 1325 may be configured to receive power from a power supply (not shown) that is external from the exhaust pipe heater 1320 to supply electrical current to the heating wire.

The exhaust pipe heater 1320 may be configured to heat gas inside the exhaust pipe 1310 to reduce toxic gases and/or particulate matter exiting the exhaust pipe 1310. The exhaust pipe 1310 may further include one or more magnets arranged adjacent to an exterior surface 1315 of the exhaust pipe 1310 to aid in disruption and slowing of the flow of exhaust gases in the cavity 1380 of the exhaust pipe 1310. The exhaust pipe 1310 may further include a second surface (not shown) that is positioned outside of the exterior surface 1315 and the one or more magnets may be disposed between the second surface and the exterior surface 1315 of the exhaust pipe 1310. The second surface may be a surface of an exterior shell, an exterior casing, tape or other adhesive, a fastener, etc.

Figure 15:
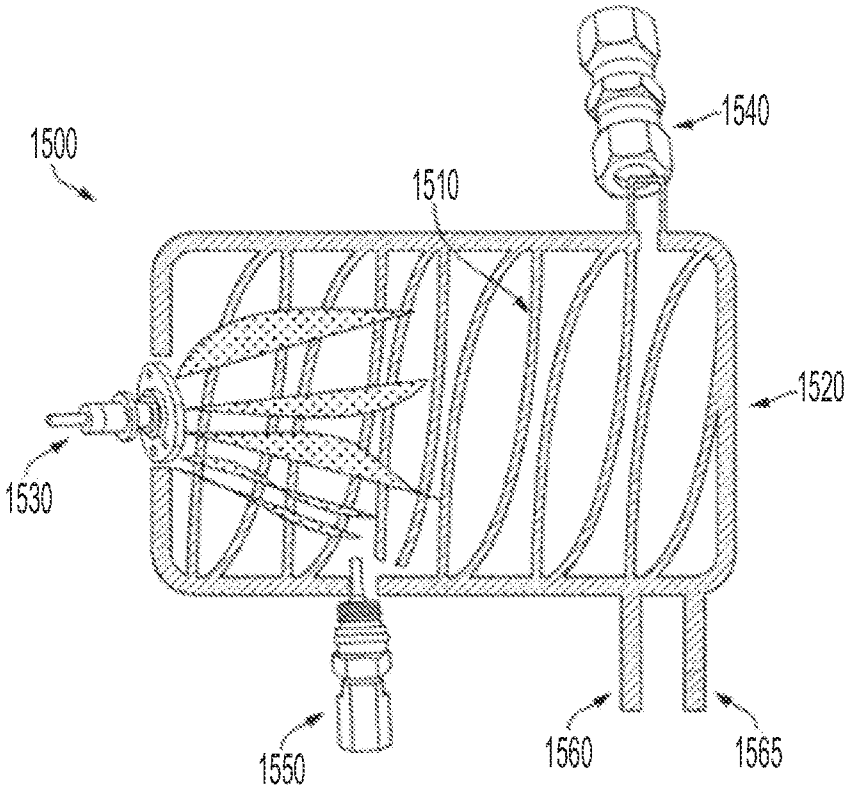
FIG. 15 is a view of an external heater, according to one or more embodiments of the present disclosure.

FIG. 15 shows an external heater 1500 according to an embodiment of the invention. The external heater 1500 may be located external and be connected to one or more components of an exhaust system. The one or more components may be a catalytic converter, a selective catalytic reduction system (SCR), a diesel oxidation catalyst, a diesel particulate filter (DPF), a selective catalytic reduction system (SCR), a muffler, or exhaust pipes of the exhaust system (shown in FIG. 17).

In one embodiment, the external heater 1500 has a heater housing 1520, which may be made of steel or aluminum (not limited thereto), and a heating wire 1510 or alternative a heating element disposed therein. The heating wire 1510 is not limited to any configuration or shape. The external heater 1500 may further include a connection pipe 1540 (such as a metal or flexible connection pipe or other attachment means such as connection pipe 1715 described below) and a temperature sensor 1550 (such as temperature sensors 1052, 1053, 1055, 1058 described above). Temperature sensor 1550 may also function as an altitude sensor.

The external heater 1500 may further include a dosing system 1530. The dosing system 1530 may include a dosing injector (such as dosing injectors 1010, 1012, 1340 described above) coupled to a dosing solution tank (such as dosing solution tanks 1006, 1008, 1350 described above) for injecting or pumping a dosing solution, such as a urea, salt water, or ammonia solution, among other possible solutions, into the exhaust system. The dosing solution may be injected into the external heater 1500 at a predetermined temperature or a predetermined temperature range to further improve reduction or removal of harmful gases (e.g., NOx, etc.) in the exhaust system. The external heater 1500 may receive power from a power supply (not shown) via an electrical connector or via first and second terminals 1560 and 1565. For example, first terminal 1560 may be a positive terminal and second terminal 1565 may be a negative terminal. In a gasoline or diesel powered vehicle, the external heater 1500 may be electrically connected to and powered by the vehicle's primary battery (not shown) or alternatively a secondary battery (not shown) via first and second terminals 1560 and 1565.

Figure 16:
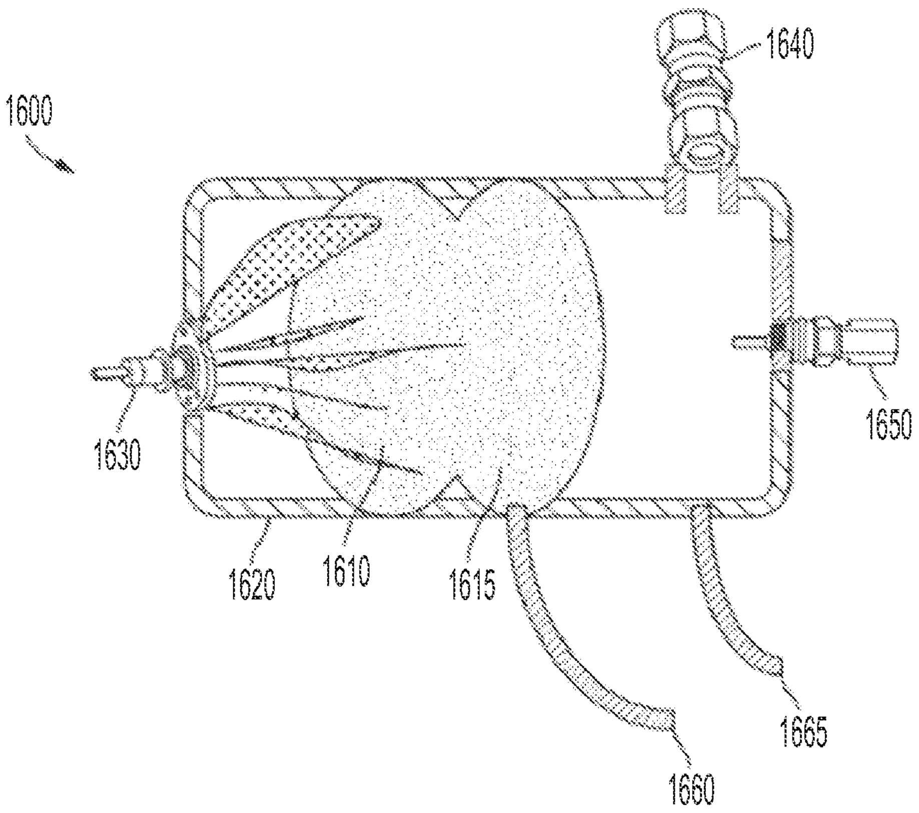
FIG. 16 is a view of an external heater, according to one or more embodiments of the present disclosure.

FIG. 16 shows an external heater 1600 according to another embodiment of the invention. The external heater 1600 may be located external and be connected to one or more components of an exhaust system. The one or more components may be a catalytic converter, a selective catalytic reduction system (SCR), a diesel oxidation catalyst, a diesel particulate filter (DPF), a selective catalytic reduction system (SCR), a muffler, or exhaust pipes of the exhaust system (shown in FIG. 17).

In one embodiment, the external heater 1600 has a heater housing 1620, which may be made of steel or aluminum (not limited thereto), and a plurality of heating elements 1610, 1615 disposed therein. The heating elements are 1610, 1615 is not limited to any configuration or shape. The heating elements 1610, 1615 may include a heating wire and/or a heating element, for example, a honeycomb, or hexagonal shape heater. Thus, the heating elements 1610, 1615 may act as a filter and may include a catalyst coating to aid in the removal or reduction of harmful gases and particulate matters.

The external heater 1600 may further include a connection pipe 1640 (such as a metal or flexible connection pipe or other attachment means such as connection pipe 1715 described below) and a temperature sensor 1650 (such as temperature sensors 1052, 1053, 1055, 1058, 1550 described above). Temperature sensor 1650 may also function as an altitude sensor. The external heater 1600 may further include a dosing system 1630. The dosing system 1630 may include a dosing injector (such as dosing injectors 1010, 1012, 1340 described above) coupled to a dosing solution tank (such as dosing solution tanks 1006, 1008, 1350 described above) for injecting or pumping a dosing solution, such as a urea, salt water, or ammonia solution, among other possible solutions, into the exhaust system.

The dosing solution may be injected into the external heater 1600 at a predetermined temperature or a predetermined temperature range to further improve reduction or removal of harmful gases (e.g., NOx, etc.) in the exhaust system. The external heater 1600 may receive power from a power supply (not shown) via an electrical connector or via first and second terminals 1660 and 1665. For example, first terminal 1660 may be a positive terminal and second terminal 1665 may be a negative terminal. In a gasoline or diesel powered vehicle, the external heater 1600 may be electrically connected to and powered by the vehicle's primary battery (not shown) or alternatively a secondary battery (not shown) via first and second terminals 1660 and 1665.

Figure 17:
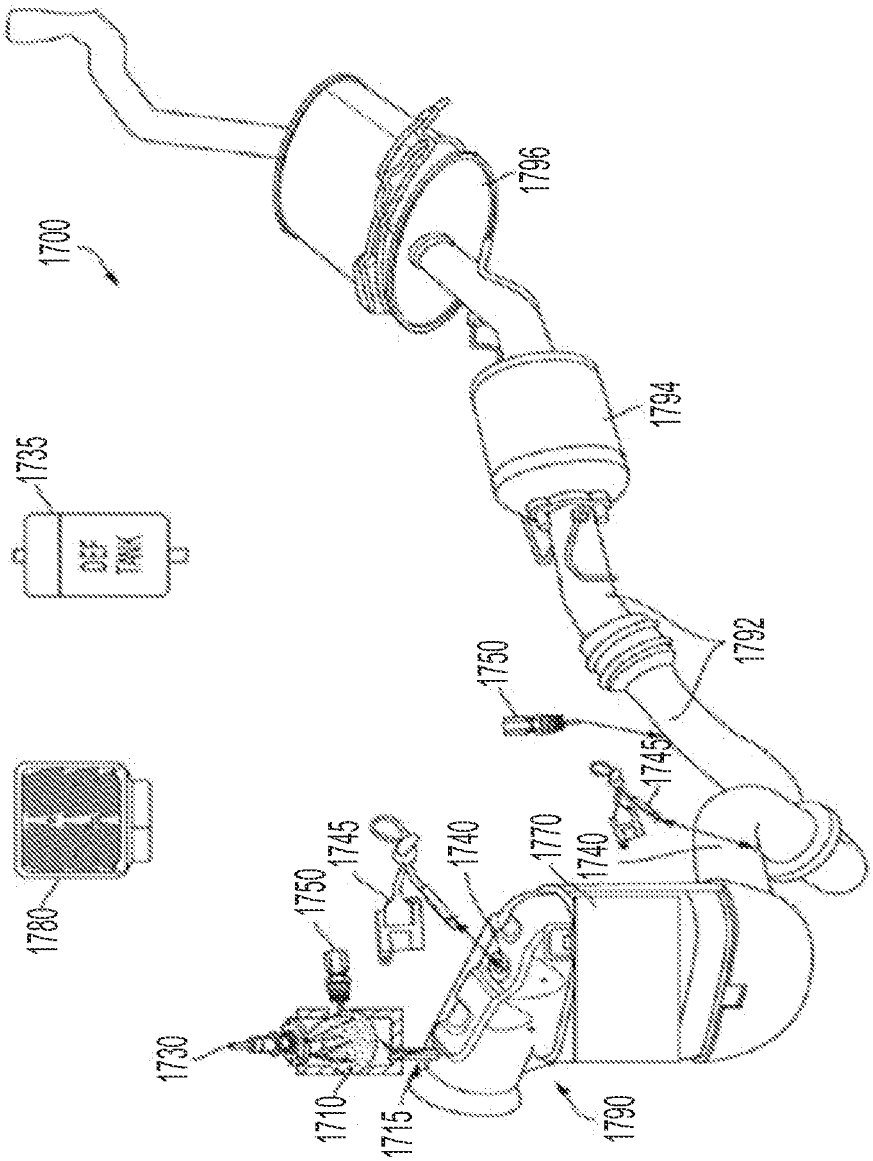
FIG. 17 is an assembly view of an exhaust system having one or more external heaters, according to an embodiment of the present disclosure.

FIG. 17 shows an exhaust system 1700 that incorporates one or more external heaters 1710 (such as external heaters 1500 and 1600 described above). In one embodiment, the exhaust system 1700 includes, but is not limited to, a catalytic converter or DPF 1790, exhaust pipes 1792, a SCR 1794 and a muffler 1796. The external heater 1710 may be connected to any one or more of the foregoing components of the exhaust system 1700. In FIG. 17 the external heater 1710 is located external and connected to the catalytic converter/DPF 1790. It is understood that the external heater 1710 can be connected to a different component, such as at an inlet of the SCR 1794, or to both the catalytic converter/DPF 1790 and the SCR 1794 (or other component, such as one or more exhaust pipe 1792).

The external heater 1710 may be connected to the exhaust system component—in this embodiment the catalytic converter/DPF 1790—via a connection pipe 1715, such as a metal or flexible connection pipe or other attachment means. Alternatively, the external heater 1710 may be directly coupled to the exhaust system component by either forming a hole and fastening the external heater 1710 to the hole or by using an existing sensor hole in the exhaust system component.

The external heater 1710 may include one or more temperature sensors 1750 (such as temperature sensors 1052, 1053, 1055, 1058, 1550, 1650 described above). Temperature sensor 1750 may also function as an altitude sensor. The external heater 1710 may further include a dosing system 1730. The dosing system 1730 may include a dosing injector (such as dosing injectors 1010, 1012, 1340 described above) coupled to a dosing solution tank 1735 (such as dosing solution tanks 1006, 1008, 1350 described above) for injecting or pumping a dosing solution, such as a urea, salt water, or ammonia solution, among other possible solutions, into the exhaust system.

The dosing solution may be injected into the external heater 1710 at a predetermined temperature or a predetermined temperature range to further improve reduction or removal of harmful gases (e.g., NOx, etc.) in the exhaust system. The external heater 1710 may receive power from a power supply (not shown) via an electrical connector. In a gasoline or diesel powered vehicle, the external heater 1600 may be electrically connected to and powered by the vehicle's primary battery (not shown) or alternatively a secondary battery (not shown).

The exhaust system 1700 may further include one or more gas sensors 1740 (such as gas sensors 1050, 1054, 1056 described above). The gas sensors 1740 may include, for example, an oxygen (e.g., O2) sensor, but are not limited thereto and any suitable gas sensor may be utilized based on the desired application of the exhaust system 1700. Each of the gas sensors 1740 may be controlled by a dedicated controller 1745 that is separate from, for example, an existing controller of the vehicle exhaust system.

The catalytic converter/DPF 1790 may include one or more magnets 1770 located or arranged adjacent to or on an exterior surface of the catalytic converter/DPF 1790. The one or more magnets 1770 may be disposed in an array having alternating polarities. In one embodiment, the magnets 1770 facing each other may have opposing polarities. Alternatively, the one or more magnets 1770 may have the same polarity and the polarity may not vary along the longitudinal or horizontal direction of the catalytic converter/DPF 1790. Having magnets facing each other with opposite polarities results in a stronger magnetic field.

In one embodiment, the plurality of magnets 1770 may include one or more neodymium magnets. In another embodiment, the one or more magnets 1770 may be electromagnets. However, any suitable magnets may be used depending on the desired application. It is understood that the one or more magnets 1770 may be located adjacent or on an exterior surface of other components of the exhaust system, such as the SCR 1794, muffler 1796, and/or exhaust pipes 1792.

Additionally, gas sensors 1740 may be coupled external to one or more components of the exhaust system 1700. In FIG. 17, a first gas sensor 1740 is coupled to the catalytic converter/DPF 1790 and a second gas sensor 1740 is coupled to an exhaust pipe 1792 attached to an outlet port of the catalytic converter/DPF 1790. The gas sensors 1740 may include, for example, an oxygen (e.g., $O_2$) sensor, but are not limited thereto and any suitable gas sensor may be utilized based on the desired application of the exhaust system 1700. Each of the gas sensors 1740 may be controlled by a dedicated controller 1745 that is separate from, for example, an existing controller of the vehicle exhaust system.

Additionally, temperature sensors 1550 may be coupled externally to one or more components of the exhaust system 1700. For example, as illustrated in FIG. 17, a temperature sensor 1750 is coupled externally to an exhaust pipe 1792 attached to an outlet port of the catalytic converter/DPF 1790. Temperature sensor 1750 may also function as an altitude sensor.

Additionally, the exhaust system may be coupled to a controller 1780. The controller 1780 may receive signals from the temperature sensors 1750 to controls the external heater 1710. Further, the controller 1780 may receive signals from the temperature sensors 1750 to control the dosing system 1730. For example, when a predetermined temperature in the catalytic converter/DPF 1790 is detected by the temperature sensor 1750, the controller 1780 may send command signals to the dosing system 1730 to inject or shoot dosing solution into the catalytic converter/DPF 1790.

In one embodiment, the dosing system 1730 may continuously inject dosing solution supplied by the dosing solution tank 1735 into the catalytic converter/DPF 1790 at a predetermined interval if the temperature sensor 1750 detects that a predetermined temperature is maintained. Alternatively, the temperature sensor 1750 may be configured to detect a predetermined temperature range, for example, about 340 to 410 degrees Celsius. In other words, the dosing solution injected into the catalytic converter/DPF 1790 at the predetermined temperature or the predetermined temperature range may improve reduction or removal of harmful gases (e.g., NOx, etc.) in the catalytic converter/DPF 1790.

In one embodiment, the gas sensors 1740 may transmit data related to the condition or state of the exhaust gas to the dedicated controller 1745. Accordingly, the controller 1745 may utilize the received gas data to monitor the effectiveness of the catalytic converter/DPF 1790 and to perform appropriate functions to achieve desirable performance of the catalytic converter/DPF 1790.

V. Control System

As described above, this disclosure includes an intelligent and adaptive control system that may be integrated into the pollution control and exhaust systems described above, allowing real-time monitoring of pollutant levels and adaptive adjustments to filtration and other operating parameters accordingly. The control system may also or alternatively facilitate efficient and reliable system diagnostics, such as for diagnosing sensor faults and/or determining that one or more system components needs cleaning, service, or replacement.

Figure 18:
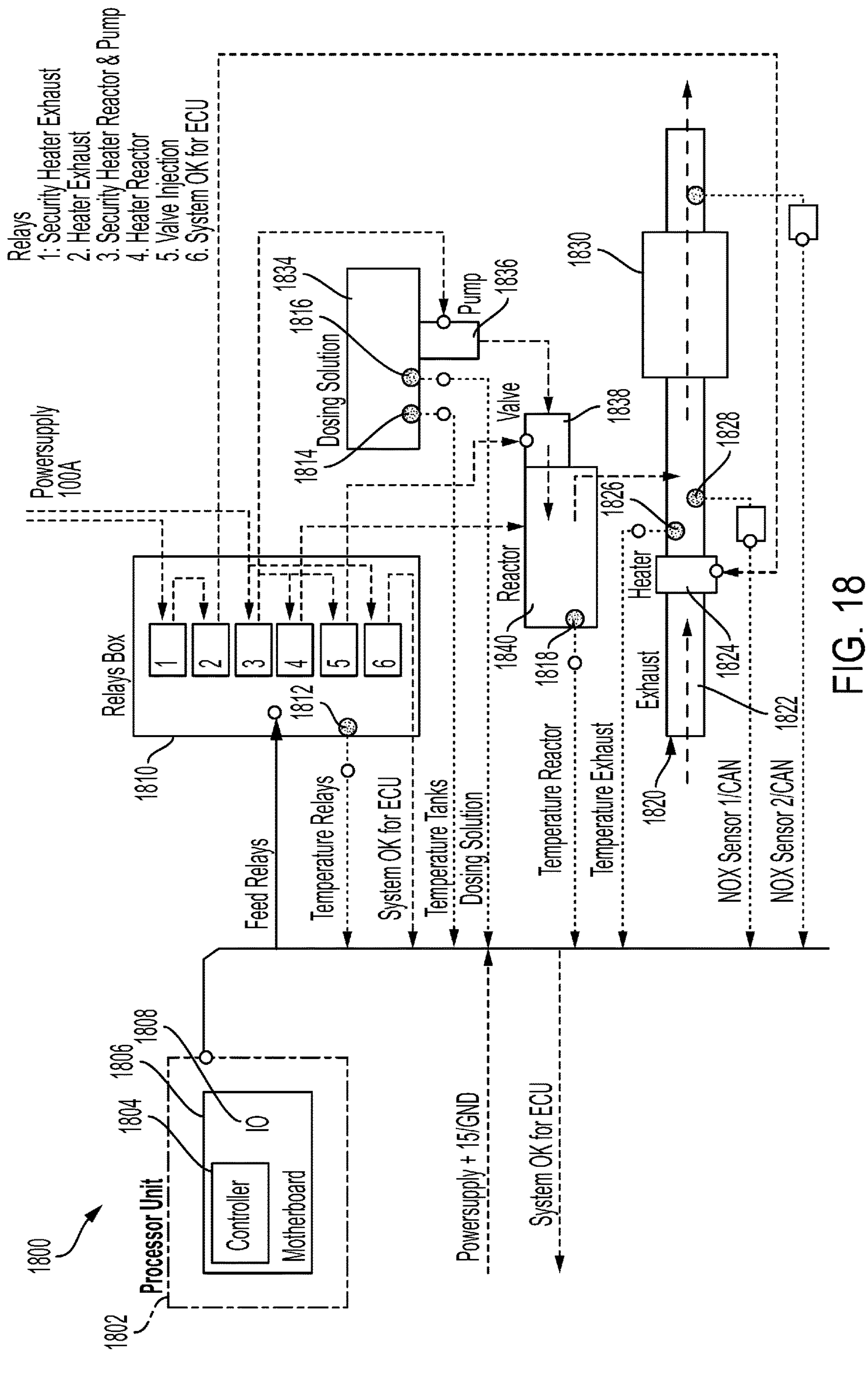
FIG. 18 illustrates a system diagram of a control system for a pollution control system in accordance with some embodiments of the present disclosure.

FIG. 18 illustrates an example embodiment of an adaptive control system 1800 that can be used to control operation of the pollution control and exhaust systems of this disclosure (also referred to as "pollution removal systems"). The control system 1800 can be used to control operation of both the industrial and vehicle exhaust systems described above. The control system 1800 facilitates optimal or improved performance under varying operational conditions, while also allowing incorporation of energy-efficient operations to minimize power consumption and operational costs, contributing to the overall sustainability of industrial and vehicular operations. The control system 1800 facilitates flexible and optimizable control with the ability to balance performance and efficiency based on needs.

The control system 1800 may maintain a record of operating conditions and conditions for ongoing optimization and maintenance. Records may be presented as a user-friendly visualization based on a database or record of this data, improving accessibility of the data. Automated diagnostics and/or notifications help provide proactive responses to potential system faults and limiting or eliminating operational downtimes. For example, when used to control an industrial exhaust system (see FIGS. 1-9), the control system 1800 may be part of the control panel 800 of FIG. 8. Data may be presented on the control panel 800 for operators to improve operations, identify issues, and generally have improved insight into operations. Data may also or alternatively be transmitted to a centralized control location and/or remote user devices (e.g., via a smartphone or tablet application) for managing plant operations. This information may be used to proactively adjust operations to improve efficiency and/or pollutant removal. Data collected by the control system 1800 may be used to automatically shut down operations if temperatures exceed limits or another high-level fault is detected. The control system 1800 may also facilitate automation of process controls, such as providing regular (e.g., hourly) stirring of dosing solution tanks and the like.

As another example, when used to control a vehicle exhaust system (see FIGS. 10-17 and corresponding description above), the control system 1800 may be all or part of the various controllers described above, such as controllers 1002, 1202, 1745, and 1780. A display in the vehicle and/or on a vehicle operator's device, such as a smartphone, may display data collected by the control system 1800 and, optionally, allow for input of certain control operations. For example, the display may provide for viewing of emissions characteristics of the vehicle, temperatures, and the like based on sensor measurements. An application on the vehicle display device and/or the operator's smartphone may facilitate viewing of information from the control system 1800. This information may be accessible to the vehicle operator and/or or a vehicle fleet manager, allowing a record of pollution controls to be efficiently and reliably obtained and available (e.g., as a visual representation of temperatures, pollutant levels, etc.). This information may be specific to a given vehicle and/or recorded for a fleet of vehicles, such that information is available on multiple scales to help ensure improved pollutant removal is achieved.

The control system 1800 includes at least one processor unit 1802 and control power relays 1810 (also referred to as "relays") that are communicatively coupled with sensors 1812, 1814, 1816, 1818, 1826, 1828, 1832 and other system components, such as pump 1836, valve 1838, heater assembly 1840, and flue heater(s) 1824. The processor unit 1802 includes a motherboard 1806 with an integrated controller 1804 and input/output (IO) interface. The controller 1804 may include the same or similar components to those described above with respect to FIG. 7, such as a processing unit and memory. For example, the controller 1804 may include one or more processors and memory. The memory may include volatile storage (e.g., random access memory), non-volatile storage (e.g., read-only memory), flash memory, or any combination of such memories. The memory may store one or more program modules (e.g., the same as or similar to program modules 1140 and determination modules 1204 described above with respect to FIGS. 7 and 12). The program modules may include instructions for gathering sensor data, determining control operations based on the sensor data (e.g., through comparison to predefined thresholds or using one or more control algorithms), and generating control signals to appropriately adjust operating conditions of the pollution removal system.

The IO interface 1808 facilitates communication between the processor unit 1802 and sensors 1812, 1814, 1816, 1818, 1826, 1828, 1832, as well as with relays 1810 that convert control signals generated by the processor unit 1802 into voltages that are provided to adjust system equipment (e.g., to activate pump 1836, heater(s) of heater assembly 1840, valve 1838, and/or flue heater(s) 1824, as described in greater detail below). The relays 1810 are connected to the processor unit 1802 and a power supply. As an example, the IO interface 1808 may include any appropriate interface for wired and/or wireless communication between the processor unit 1802 and other system components. Data may be presented to users via the IO interface 1808 through a database-based visualization on a local display and/or on a remote device, such as user's personal computer, tablet, or smartphone.

Relays 1810 receive control signals from the processor unit 1802 and distribute power for controlling system operations based on the control signals. In the example of FIG. 18, the relays 1810 include six inputs/outputs (IOs) for receiving power from a power source and distributing all or a portion of this power based on control signals from the processor unit 1802. The first IO of relays 1810 provides power for securing the flue heater(s) 1824, for example, in situations in which the temperature in the flue system 1820 is excessively high (e.g., above a predefined threshold value). For example, a temperature measured by temperature sensor 1826 may be used to determine when an action should be taken by the first IO of relays 1810 to turn off or decrease heat provided by flue heater(s) 1824.

A second IO of relays 1810 provides power to flue heater(s) 1824. For example, if a temperature of the flue gas is below a predefined threshold, the processor unit 1802 may provide a control signal to relays 1810, which then provides power to the flue heater(s) 1824 to increase the temperature of the flue gas (e.g., by increasing power supplied to flue heater(s) 1824). A third IO of relays 1810 provides power to pump 1836 (e.g., pump 650 or a pump of the vehicle exhaust systems described above) based on control signals from the processor unit 1802. For example, a different rate of dosing solution flow may be needed based on the temperature in the heater assembly 1840 (from sensor 1818) and/or an amount of pollutant present in the flue system 1820 (from sensors 1828 and/or 1832). A power signal from the third relay may be used to adjust the pump 1836 to achieve a desired flow rate, to adjust the heat assembly temperature, and/or otherwise provide improved pollution removal.

A fourth IO of relays 1810 provides power to heater(s) of the heater assembly 1840. The heater assembly 1840 generally provides heat to vaporize or increase the temperature of dosing fluid that is provided to the flue system 1820 to help remove pollutants from exhaust gas. The heater assembly may correspond to heater assembly 300 or external heaters 1500, 1600, described above. For example, additional power may be provided to increase the temperature of the heater assembly 1840. A fifth IO of relays 1810 provides power to control valve 1838, for example, to adjust the pressure in the heater assembly 1840. A sixth IO of relays 1810 provides communication back to the processor unit 1802, for example, to communicate the completion of control operations, indicate other operations of the relays 1810, and the like.

Temperature sensor 1812 is located in, on, or near the relays 1810 to measure temperature in and/or around the relays 1810. This temperature may be used to detect a high temperature indicative of some malfunction or damage to the relays 1810. Temperature data from temperature sensor 1812 may be used to automatically generate and provide a notification indicating a need for preventative maintenance and/or testing to diagnose a possible issue with the relays 1810 and/or other components of the pollution removal system.

Sensors 1814 and 1816 measure properties in and/or around the dosing solution tank 1834 (e.g., tank 100, 1006, 1008, 1350, or 1735 described above). Temperature sensor 1814 measures a temperature of dosing solution in the tank 1834, and fluid-level sensor 1816 measures a fluid level in the tank 1834. This information may be used by the processor unit 1802 to control pump 1836 to modify the rate of dosing solution exiting the tank 1834. If the fluid level becomes lower than a predefined threshold, a notification may be provided to prompt refilling of the tank 180 to help avoid downtime during which pollutant removal efficiency may be reduced. A record of fluid levels recorded by fluid-level sensor 1816 may be used to provide a record of dosing solution usage over time. This record might be used to determine operating parameters that allow decreased dosing solution usage, while maintaining high pollutant removal levels. The record may be presented to users as a database-based visualization. In some cases, information from sensors 1814, 1816 associated with the tank 1834 may be used to control pump 1836. For example, pump 1836 may be automatically shut off when the pressure in dosing tubing connecting the tank 1834 to the heater assembly 1840 is below a predetermined level.

Temperature sensor 1818 measures a temperature in, on, or near the heater assembly 1840. The temperature measured by temperature sensor 1818 may be used by the processor unit 1802 to adjust power to heater assembly 1840 (e.g., from the fourth IO of relays 1810) to maintain the temperature in a target range. The temperature measured by temperature sensor 1818 may also or alternatively be used by the processor unit 1802 to adjust a pressure of the heater assembly 1840 using pressure-control valve 1838 (e.g., one or more solenoids to control pressure of dosing solution in the heater assembly 1840) and/or a rate at which pump 1836 provides dosing solution from the tank 1834 to the heater assembly 1840 (e.g., to achieve desired properties of the vaporized dosing solution that is to then provided to the flue system 1820 to improve pollutant removal). If the temperature measured by temperature sensor 1818 is outside a predefined range (e.g., above or below predefined threshold levels) the processor unit 1802 may generate and send a notification indicating a possible issue with the heater assembly 1840, thereby facilitating proactive identification and correction of potential system faults. Temperature values measured by temperature sensor 1818 may be recorded over time for presentation in an easily accessible database-based visualization of system operations, such that proactive steps can be taken to diagnose system faults and/or improve system performance. The processor unit 1802 may more generally vary temperature and/or pressure of the heater assembly 1840 to achieve target properties of vaporized dosing solution that is provided to the flue system 1820 via an injector of the heater assembly 1840.

Flue system 1820 generally includes a flue 1822 for channeling post combustion gases to a flue emission outlet in the direction of flow indicated by the dashed line shown in FIG. 18. Flue system 1820 may be the same as or similar to flue systems described above (e.g., flue systems 190 and 505 or exhaust systems 1300, 1700). While referred to as a flue system 1820, the flue system 1820 may correspond to a vehicle exhaust system, as described above with respect to various embodiments above. Flue system 1820 may also include flue heater(s) 1824 (e.g., the same as or similar to heater 410 for an industrial exhaust system or heaters 1020, 1026 for a vehicle exhaust system, as described above) and filter and catalyst unit(s) 1830. The flue heater(s) 1824 may be arranged inside the flue 1822 and adjacent to or near one or more filters included in the filter and catalyst unit(s) 1830.

Control signals provided from the processor unit 1802 via relays 1810 (see relay 2 in FIG. 18) adjust the amount of heating provided by the flue heater(s) 1824 based on information from sensors 1812, 1814, 1816, 1818, 1826, 1828, 1832. For example, if a temperature determined from data provided by temperature sensor 1826 is outside a predefined target range, the amount of heating provided by flue heater(s) 1824 may be adjusted (e.g., by changing a voltage provided to the flue heater(s) 1824) to allow the temperature to decrease or to increase the temperature to achieve a temperature in the target range. A control algorithm, such as PID control, may be used to control the temperature of the flue gas downstream from the flue heater(s) 1824. As another example, if the concentration of pollutants (e.g., NOx (nitrogen oxide), $SO_2$ (sulfur dioxide), and/or other gases), increases upstream of the filter and catalyst unit(s) 1830, as measured by gas sensor(s) 1828 and/or 1832, the temperature may be adjusted (e.g., increased) using the flue heater(s) 1824 to facilitate more effective removal of the higher level of pollutants.

In some cases, gas sensor(s) 1828 and/or 1832 measure particulate levels in addition to or instead of gas content (e.g., NOx, $SO_2$, and/or other gases). In such cases, control decisions determined by the processor unit 1802 may be based at least in part on the particulate levels. For example, the processor unit 1802 may detect that emission results and/or particulate levels are changing by, for example, detecting higher levels of pollution via data from gas sensor(s) 1828 and/or 1832, and determine a diagnostic that one or more of the components needs cleaning or replacement.

The filter and catalyst unit(s) 1830 include filters and/or catalysts, such as those described above, capable of removing particulates and pollutants from the flue gas. For example, the filter and catalyst unit(s) 1830 may be stored in cassettes or another appropriate holder, such that gas can travel through and contact the catalyst material. The filter and catalyst unit(s) 1830 may further include one or more magnets. For example, the filter and catalyst unit(s) 1830 may include one or more electromagnets or electromagnet units coupled to the flue 1822 and able to provide a magnetic field within the flue 1822. The processor unit 1802 and relays 1810 may control the amount of power that provided to the electromagnets based on sensor data to improve pollutant removal. For example, the power provided to the electromagnet(s) may be increased if a suitably high temperature is not available and/or the content of pollutants is above a threshold. In this way, benefits of the magnetic field may not only supplement the removal of pollutants under optimal conditions but also make up for deficiencies when otherwise optimal conditions may not be available, whether permanently due to system constraints or temporarily due to a need for system maintenance.

The flue system 1820 may further include one or more blowers to control a rate of flow of flue gas through the flue 1822. The blowers may be located at various portions of the emissions system to ensure proper flow rate and effective pollution reduction. The processor unit 1802 and relays 1810 may control the amount of power provided to the one or more blowers based on data from sensors 1812, 1814, 1816, 1818, 1826, 1828, 1832. For example, if a pollution content measured downstream from the filter and catalyst unit(s) 1830 is greater than a threshold value, the power provided to the blower(s) may be decreased to increase the residence time of flue gas in the flue 1822 and thereby allow more time for interaction with catalyst and dosing solution vapor and catalyst.

Notifications may be generated by the processor unit 1802 and provided for display locally (e.g., on a display coupled to the processor unit 1802, such as on the control panel 800 of FIG. 8) and/or remotely (e.g., on a user device, such as a personal computer, tablet, smartphone, or the like). The notification may indicate a predicted fault and, optionally a prescribed corrective action, such as to replace one or more filters, replace or service one or more heating units, refill tank 1834, and the like. Other corrective actions are described above.

The control system 1800 may include more or fewer elements than are shown in FIG. 18. For example, more sensors may be included to measure pressure alongside temperature in the tank 1834 and/or heater assembly 1840 or any other process variable of interest. While the processor unit 1802 and relays 1810 are shown as separate interconnected components, in other embodiments these components may be integrated into a single control and relay subsystem.

Figure 19:
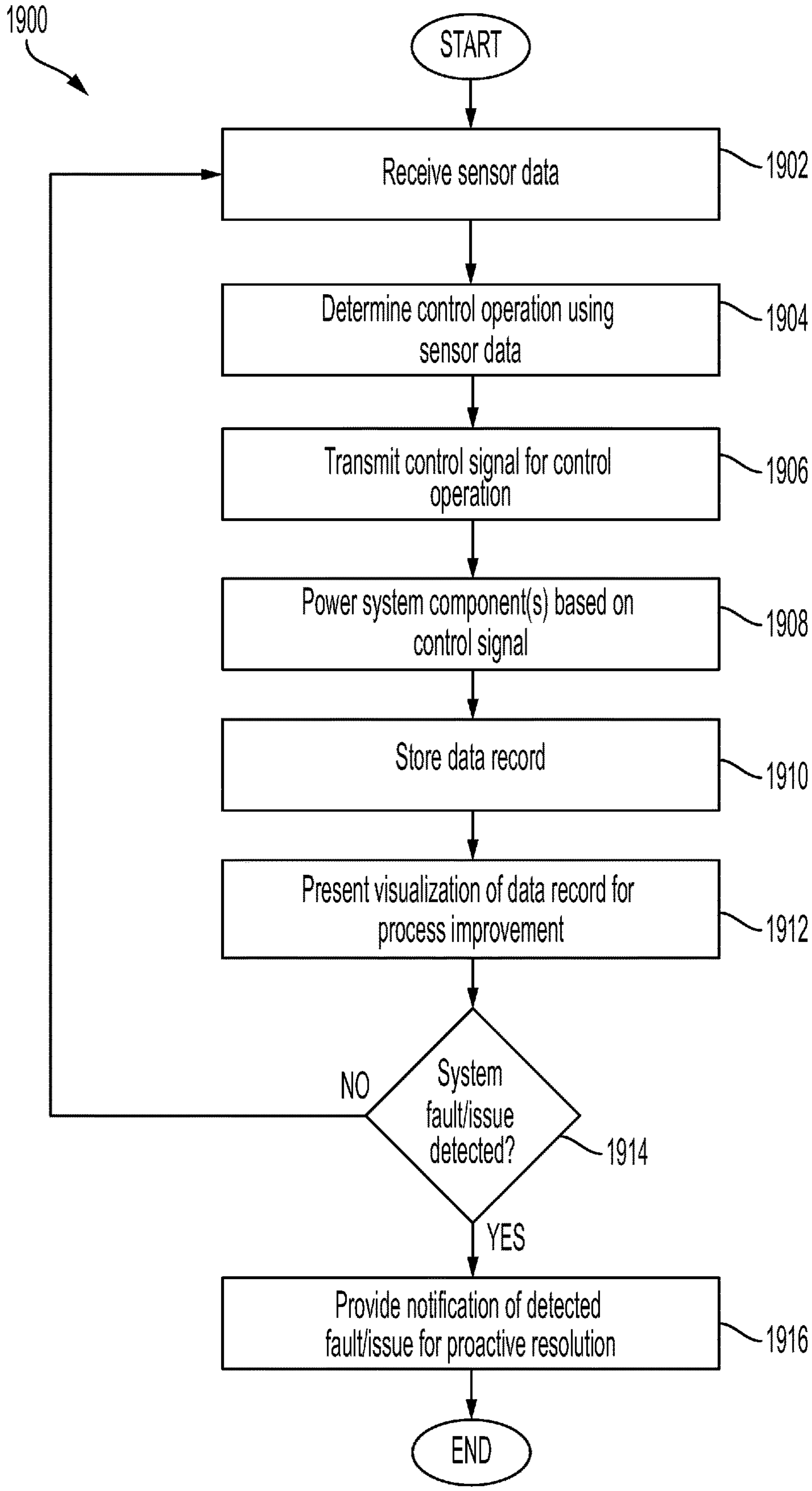
FIG. 19 illustrates a flowchart of a method of operating the control system of FIG. 18 in accordance with some embodiments of the present disclosure.

FIG. 19 shows an example method 1900 of operating the control system 1800 of FIG. 18. The method 1900 facilitates improved pollutant removal from flue gas by allowing improved control of operating conditions and improved insight into system performance (e.g., via notifications and visualizations). The method 1900 may be begin at step 1902 where sensor data is received corresponding to properties the dosing solution tank 1834, the heater assembly 1840, and/or the flue system 1820. For example, the sensor data may be obtained from one or more of the sensors 1812, 1814, 1816, 1818, 1826, 1828, 1832. At step 1904, a control operation is determined using the sensor data for improving removal of pollutants from the flue gas. For example, the processor unit 1802 may compare temperatures, pressures, pollutant levels, and/or other properties indicated by the sensor data to predefined thresholds associated with these properties. Based on differences between the value(s) and their corresponding threshold value(s), a control operation may be determined to bring the value(s) nearer a target value that has been determined to improve pollutant removal and/or system efficiency.

At step 1906, a control signal is transmitted corresponding to the control operation. For example, the processor unit 1802 may transmit the control signal to the relays 1810 via IO interface 1808.

At step 1908, the control signal is used to appropriately power components of the pollution removal system. For example, the power relays 1810 may receive the control signal and use the control signal to generate and transmit a corresponding power signal to adjust operation of at least one component of the pollution removal system (e.g., pump 1836, heater assembly 1840, valve 1838, and/or heater(s) 1824). As an example, in some cases, the received sensor data includes a temperature of the flue gas downstream from the heater 1824. In such cases, the control signal may be generated for maintaining the temperature of the flue gas downstream from the heater 1824 within a predefined temperature range, and the relays 1810 may provide the corresponding power signal for powering the heater based on the control signal. As another example, the received sensor data may include a pollutant content of the flue gas downstream from the heater 1824 and/or the filter and catalyst unit(s) 1830 (from gas sensor(s) 1828 and/or 1832). In such cases, the control signal may be determined to decrease the pollutant content to at least below a predefined value, and the relays 1810 provide the corresponding power signal for powering heater(s) of the heater assembly 1840 and/or the flue heater 1824 based on the control signal.

As yet another example, in some cases, the received sensor data includes a temperature of the heater assembly 1840. In such cases, the control signal is determined to adjust properties of the vaporized dosing solution via controlling at least one of an amount of heating provided to the heater assembly 1840 and a pressure of the heater assembly, and the relays 1810 provide the corresponding power signal for powering at least one of the heater of the heater assembly 1840 and the valve 1838 based on the control signal. As a further example, in some cases, the received sensor data includes a pollutant content of the flue gas (from gas sensor(s) 1828 and/or 1832). In such cases, the control signal is determined for decreasing the pollutant content based on modifications to properties of the vaporized dosing solution. The relays 1810 then provide the corresponding power signal for powering at least one of the heater of the heater assembly 1840 and the valve 1838 based on the control signal. As still a further example, in cases where the flue system 1820 includes an electromagnet coupled to the flue 1822, a control signal may be determined for operating the electromagnet, and power may be supplied to the electromagnet according to the control signal.

Still referring to FIG. 19, at step 1910, a record of sensor data and other operating conditions may be stored over time (e.g., in memory of the processor unit 1802 and/or another associated memory). At step 1912, a data visualization is presented (e.g., on a local or remote display communicatively coupled to the processor unit 1802). The data visualization may facilitate process improvements and/or identification of system maintenance that may be needed, as described above.

At step 1914, the processor unit 1802 determines whether a fault or other issue is detected in the pollution removal system. For example, sensor data from step 1902 may be used to determine that a sensor is malfunctioning, that a filter needs cleaning or replacement, that dosing tank 1834 needs to be refilled, and the like. In some cases, the record from step 1910 may be used to detect a system fault or issue at step 1914. At step 1916, a notification is sent or presented indicating the possible fault or issue detected at step 1914. As an example, the received sensor data may include a temperature and/or a liquid level of dosing solution in the dosing solution tank 1834. If the temperature and/or the liquid level of dosing solution in the dosing solution tank 1834 is outside a predefined threshold range or below a threshold level, the processor unit 1802 may send a notification indicating a need to service or refill the dosing solution tank 1834.

Benefits of the disclosed system can result in a much greater reduction of harmful gasses and particulates compared to conventional technologies. Embodiments may also reduce or eliminate the need for tall smokestacks or flues because the emissions will be much less dangerous to life. Embodiments may allow existing industrial systems to be retrofitted and operated to conform to more stringent pollution standards, thereby extending the operational life of these systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any portions of this application. Where the context permits, words in the above Detailed Description using the singular or plural number may also include the plural or singular number, respectively. The word "or," in reference to a list of two or more items, covers all the following interpretations of the word: any of the items in the list, all the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

I claim:

1. A method of controlling a heater assembly of an exhaust system that is configured to vaporize a dosing solution, the method comprising:

receiving, at a controller, from one or more sensors, sensor data comprising (i) temperature data indicative of a temperature of the heater assembly and (ii) pollutant content data indicative of a pollutant content of an exhaust gas in an exhaust gas flow path of the exhaust system;

determining, by the controller, based on both the temperature data and the pollutant content data, a heater adjustment value for adjusting operation of the heater assembly;

determining, by the controller, based on both the temperature data and the pollutant content data, an injector adjustment value for adjusting operation of a dosing solution injector;

transmitting a first control signal corresponding to the heater adjustment value to adjust the operation of the heater assembly to achieve a temperature indicated by the heater adjustment value; and transmitting a second control signal corresponding to the injector adjustment value to adjust the operation of the dosing solution injector to achieve a pressure of the dosing solution in the heater assembly indicated by the injector adjustment value.

2. The method of claim 1, further comprising vaporizing the dosing solution in the heater assembly arranged at least partially external to a flue or exhaust pipe, and injecting the vaporized dosing solution into the flue or exhaust pipe upstream of a catalyst.

3. The method of claim 1, further comprising transmitting at least one of the first control signal and the second control signal to a power relay coupled to a power supply, and providing, by the power relay, a corresponding power signal to at least one of the heater assembly and the dosing solution injector based on the received control signal.

4. The method of claim 1, wherein the heater assembly comprises a pressure-control valve, and the heater adjustment value corresponds to at least one of an amount of heating provided to the heater assembly and a pressure of the heater assembly.

5. The method of claim 1, further comprising:

storing a record of sensor data over time;

determining, using the record of sensor data, a possible fault of the exhaust system; and sending a notification indicating the possible fault.

6. The method of claim 1, further comprising:

providing a magnetic field within a flue or exhaust pipe via at least one electromagnet coupled to the flue or exhaust pipe;

determining, based on the pollutant content data, a third control signal for operating the electromagnet; and supplying power to the electromagnet based on the third control signal.

7. The method of claim 1, wherein the dosing solution comprises a nitrogen portion comprising urea or ammonia and an aqueous portion, and wherein the heater assembly heats the dosing solution to a temperature in a range of 400° C. to 800° C.

8. An assembly for controlling an exhaust system including an exhaust gas flow path for exhaust gas, the assembly comprising:

a heater assembly configured to vaporize a dosing solution provided by a dosing solution tank;

a dosing solution injector configured to inject the dosing solution;

one or more sensors configured to generate sensor data comprising (i) temperature data indicative of a temperature of the heater assembly and (ii) pollutant content data indicative of a pollutant content of the exhaust gas; and a controller communicatively coupled to the heater assembly, the dosing solution injector, and the one or more sensors, the controller comprising a processor configured to:

receive the sensor data from the one or more sensors;

determine, based on both the temperature data and the pollutant content data, a heater adjustment value for adjusting operation of the heater assembly;

determine, based on both the temperature data and the pollutant content data, an injector adjustment value for adjusting operation of the dosing solution injector;

transmit a first control signal corresponding to the heater adjustment value to adjust the operation of the heater assembly to achieve a temperature indicated by the heater adjustment value; and transmit a second control signal corresponding to the injector adjustment value to adjust the operation of the dosing solution injector to achieve a pressure of the dosing solution in the heater assembly indicated by the injector adjustment value.

9. The assembly of claim 8, wherein the heater assembly is configured to be arranged at least partially external to a flue or exhaust pipe of the exhaust system, the heater assembly configured to vaporize the dosing solution upstream of injection of the vaporized dosing solution into the flue or exhaust pipe.

10. The assembly of claim 8, further comprising a power relay configured to be coupled to a power supply and communicatively coupled to the controller, wherein the power relay is configured to receive at least one of the first control signal and the second control signal from the controller and to provide a corresponding power signal to at least one of the heater assembly and the dosing solution injector based on the received control signal.

11. The assembly of claim 8, wherein the heater assembly comprises a pressure-control valve, and the heater adjustment value corresponds to at least one of an amount of heating provided to the heater assembly and a pressure of the heater assembly.

12. The assembly of claim 8, wherein the processor is further configured to:

store a record of sensor data over time;

determine, using the record of sensor data, a possible fault of the exhaust system; and send a notification indicating the possible fault.

13. The assembly of claim 8, further comprising at least one electromagnet configured to be coupled to a flue or exhaust pipe of the exhaust system to provide a magnetic field within the flue or exhaust pipe, wherein the processor is further configured to determine, based on the pollutant content data, a third control signal for operating the electromagnet.

14. The assembly of claim 8, wherein the heater assembly comprises a heating element arranged in a spiral or coil configuration surrounding a direction in which a mist of the dosing solution flows.

15. The assembly of claim 8, wherein the heater assembly comprises a ribbon-shaped filament bent in a serpentine configuration, the ribbon-shaped filament having a major surface oriented perpendicular to a plane of the serpentine configuration.

16. The assembly of claim 8, wherein the exhaust system is one of an industrial flue system and a vehicle exhaust system.

17. A method of controlling an exhaust system including a heater assembly configured to heat a dosing solution, and an exhaust gas flow path for exhaust gas, the method comprising:

receiving, at a controller, from one or more sensors, sensor data comprising (i) temperature data indicative of a temperature of the heater assembly and (ii) pollutant content data indicative of a pollutant content of the exhaust gas in the exhaust gas flow path, the method further comprising one or both of:

(A-1) determining, by the controller, based on both the temperature data and the pollutant content data, a heater adjustment value for adjusting operation of the heater assembly, (A-2) transmitting a first control signal corresponding to the heater adjustment value to adjust the operation of the heater assembly, and (A-3) adjusting, based on the first control signal, the operation of the heater assembly to achieve a temperature indicated by the heater adjustment value; or the method further comprising:

(B-1) determining, by the controller, based on both the temperature data and the pollutant content data, an injector adjustment value for adjusting operation of a dosing solution injector fluidly connected to the heater assembly, (B-2) transmitting a second control signal corresponding to the injector adjustment value to adjust the operation of the dosing solution injector, and (B-3) adjusting, based on the second control signal, the operation of the dosing solution injector to adjust an amount of the dosing solution injected into the exhaust gas by the dosing solution injector.

18. The method of claim 17, further comprising vaporizing the dosing solution in the heater assembly arranged at least partially external to a flue or exhaust pipe, and injecting the vaporized dosing solution into the flue or exhaust pipe upstream of a catalyst.

19. The method of claim 17, further comprising transmitting at least one of the first control signal and the second control signal to a power relay coupled to a power supply, and providing, by the power relay, a corresponding power signal to at least one of the heater assembly and the dosing solution injector based on the received control signal.

* * * * *